(12) United States Patent
Wang et al.

(10) Patent No.: US 7,720,617 B2
(45) Date of Patent: May 18, 2010

(54) FLOW SENSOR SIGNAL CONVERSION

(75) Inventors: Chiun Wang, Cypress, CA (US);
William S. Valentine, Irvine, CA (US);
John M. Lull, Fullerton, CA (US)

(73) Assignee: Brooks Instrument, LLC, Hatfield, PA (US)

( * ) Notice: Subject to any disclaimer, the term of this patent is extended or adjusted under 35 U.S.C. 154(b) by 0 days.

(21) Appl. No.: 11/856,585

(22) Filed: Sep. 17, 2007

(65) Prior Publication Data

US 2008/0000283 A1 Jan. 3, 2008

Related U.S. Application Data

(60) Continuation of application No. 11/051,209, filed on Feb. 4, 2005, now Pat. No. 7,272,512, which is a division of application No. 10/400,149, filed on Mar. 26, 2003, now Pat. No. 7,043,374.

(51) Int. Cl.
*G01F 1/00* (2006.01)
(52) U.S. Cl. ............................. 702/45; 73/1.34; 73/861
(58) Field of Classification Search .................. 702/45, 702/100, 50; 73/861.77, 1.16, 861.356, 861, 73/1.34
See application file for complete search history.

(56) References Cited

U.S. PATENT DOCUMENTS

| | | | |
|---|---|---|---|
| 5,260,865 A | 11/1993 | Beauford et al. | |
| 5,911,238 A | 6/1999 | Bump et al. | |
| 5,944,048 A | 8/1999 | Bump et al. | |
| 5,975,126 A | 11/1999 | Bump et al. | |
| 6,343,617 B1 | 2/2002 | Tinsley et al. | |
| 6,561,218 B2 | 5/2003 | Mudd | |
| 6,575,027 B1 | 6/2003 | Larsen et al. | |
| 6,640,822 B2 | 11/2003 | Tinsley et al. | |
| 6,681,787 B2 | 1/2004 | Tinsley et al. | |
| 6,712,084 B2 | 3/2004 | Shajii et al. | |
| 6,810,308 B2 | 10/2004 | Shajii et al. | |
| 6,868,862 B2 | 3/2005 | Shajii et al. | |

(Continued)

FOREIGN PATENT DOCUMENTS

EP 0 834 723 A1 4/1998

(Continued)

OTHER PUBLICATIONS

Komiya, K., Higuchi, F. and Ohtani, K., "Characteristics Of A Thermal Gas Flowmeter," Rev. Sci. Instrum. 59(3), Mar. 1988, pp. 477-479.

(Continued)

*Primary Examiner*—Drew A Dunn
*Assistant Examiner*—Hien X Vo
(74) *Attorney, Agent, or Firm*—Sonnenschein Nath & Rosenthal LLP

(57) ABSTRACT

A method of obtaining at least one representation of a characteristic function of a sensor from a test fluid during calibration of the sensor according to a sensor model having a transfer function operating on flow rate, at least one sensor property and at least one fluid property and employing the at least one representation of the characteristic function to determine flow rates through the sensor during operation with an arbitrary fluid.

31 Claims, 19 Drawing Sheets

U.S. PATENT DOCUMENTS

| | | |
|---|---|---|
| 6,932,098 B2 | 8/2005 | Shajii et al. |
| 6,948,508 B2 | 9/2005 | Shajii et al. |
| 7,000,463 B1 * | 2/2006 | Shajii et al. ................ 73/202.5 |
| 7,004,191 B2 | 2/2006 | Shajii et al. |
| 7,036,559 B2 * | 5/2006 | Stanimirovic .............. 165/11.1 |
| 7,136,767 B2 | 11/2006 | Shajii et al. |
| 7,424,346 B2 | 9/2008 | Shajii et al. |
| 2002/0198668 A1 | 12/2002 | Lull |
| 2004/0074311 A1 * | 4/2004 | Lull et al. ..................... 73/861 |

FOREIGN PATENT DOCUMENTS

| | | |
|---|---|---|
| JP | 10207554 A | 8/1998 |
| JP | 11259140 A | 9/1999 |

OTHER PUBLICATIONS

Sheriff, D., "Mass Flow Controller Features Digital Calibration," Feb. 1993, Solid State Technology, pp. 33-34, 36.

* cited by examiner

FLOW SENSOR SIGNAL CONVERSION

CROSS-REFERENCE TO RELATED APPLICATION

This application is a continuation application of and claims the benefit under 35 U.s.c. §120 to pending U.S. patent application Ser. No. 11/051,209 filed Feb. 4, 2005 which is a divisional application of and claims the benefit under 35 U.S.C. §120 to U.S. patent application Ser. No. 10/400,419, filed on Mar. 26, 2003, entitled "Flow Sensor Signal Conversion," and issued as U.S. Pat. No. 7,043,374 B3, on May 9, 2006 each of which is hereby incorporated by reference in its entirety.

FIELD OF THE INVENTION

This invention relates to the field of mass flow sensors and, more particularly, to methods and apparatus for providing flow signals that accurately indicate the actual fluid flow of arbitrary fluids through a flow path of a sensor across a wide range of flow rates.

BACKGROUND OF THE INVENTION

Mass flow sensors are used in a wide variety of applications to measure the mass flow rate of a gas or other fluid. One application in which a mass flow sensor may be used is a mass flow controller. In a conventional mass flow controller, the mass flow rate of a fluid flowing in a main flow path is regulated or controlled based upon a mass flow rate of a portion of the fluid that is diverted into a typically smaller conduit forming a part of the mass flow sensor. Assuming laminar flow in both the main flow path and the conduit of the sensor, the mass flow rate of the fluid flowing in the main flow path can be determined (and regulated or controlled) based upon the mass flow rate of the fluid flowing through the conduit of the sensor.

A flow sensor, in general, refers to any device or combination of devices that responds to fluid flow by providing an output indicative of the fluid flow rate. A thermal mass flow sensor refers to a flow sensor that provides an output that varies with the flow rate of a fluid in a flow path based on heat convection, conduction and/or flux resulting from the flow of the fluid. The term "fluid" is used herein to describe any type of matter in any state that is capable of flow. It is to be understood that the term fluid applies to liquids, gases, and slurries comprising any combination of matter or substance capable of flow.

One conventional thermal mass flow sensor is illustrated in FIG. 1. Thermal mass flow sensor 10 includes a conduit 12 having an upstream resistance coil 14 and a downstream resistance coil 16 wound about the conduit 12 at a predetermined spacing such that the conduit has a characteristic length related to the length l. The upstream and downstream coils are coupled to sensor electronic circuit 18. Typically, coils 14 and 16 are of the variety wherein the resistance of the coil is a function of temperature. When no fluid is flowing through conduit 12, the sensor is in a balanced state. For example, coils 14 and 16 may comprise one leg of respective Wheatstone bridge configurations such that the balanced state may be achieved by having electronic circuit 18 drive upstream coil 14 and downstream coil 16 to the same temperature. When both coils are at the same temperature their resistances are equal such that the voltage drop across each resistor is also equal (i.e., V1 is equal to V2). Electronic circuit 18 may be configured to detect differences between voltage V1 and V2 and output the difference as a voltage signal 20, referred to as the sensor output signal or simply the sensor output.

As fluid flows through the conduit, the fluid transfers heat from the upstream coil 14 toward the downstream coil 16 according to properties of heat convection. As a result, the temperature of the downstream coil 16 becomes greater than that of the upstream coil 14, thereby varying the respective resistances and unbalancing the sensor electronic circuit 18. The voltage drop V2 will no longer equal the voltage drop V1 and sensor electronic circuit 18 will detect the difference in voltage drops and output the difference as the sensor output signal 20. The amount of heat transferred by convection, and thus the sensor output, is proportional to the mass flow rate of the fluid.

It should be appreciated that a sensor output need not be a voltage signal but may be any of various other signals and may depend upon the design of the flow sensor. For example, a sensor output may be a voltage signal as illustrated in FIG. 1, a current signal, a digital or analog signal or any other signal capable of indicating fluid flow through a conduit of the sensor.

Many applications, for example, semiconductor fabrication processes, may require that a particular flow sensor operate with a variety of different fluids and/or combinations of fluids. In practice, providing such a flow sensor is a difficult task. For example, the sensor output of conventional thermal mass flow sensors may depend both on the mass flow rate of the fluid in the flow path and, in part, on the type of fluid. That is, the thermal and/or physical characteristics of a fluid in the flow path may affect how the sensor output voltage changes with flow rate.

FIG. 2 illustrates sensor response curves for eight different types of fluid. A sensor response curve refers generally to any representation based on sensor output as a function of or in association with flow rate. In FIG. 2, the horizontal axis represents the actual fluid flow rate of the respective fluid through the flow path. The vertical axis represents the normalized sensor output voltage resulting from the fluid flow rate. The normalized sensor output voltage is the sensor output voltage divided by the sensor output voltage resulting when a fluid is flowing at its maximum flow rate through the flow path, referred to as full scale flow. That is, the vertical axis represents the fraction of the full scale sensor output voltage.

Ideally, each sensor response curve would be a linear function of flow rate. However, in practice it can be seen that the sensor response curves have varying degrees of curvature and that the curvature itself may be a fluid dependent function of flow rate. Conventionally, it is not well understood how the sensor response curves vary from fluid to fluid. This unpredictability makes it difficult to develop a flow sensor that responds satisfactorily to a range of fluids over an adequate range of flow rates. More particularly, it is difficult to provide a flow sensor that operates satisfactorily with an arbitrary fluid over an adequate range of flow rates.

SUMMARY OF INVENTION

Figure 1:
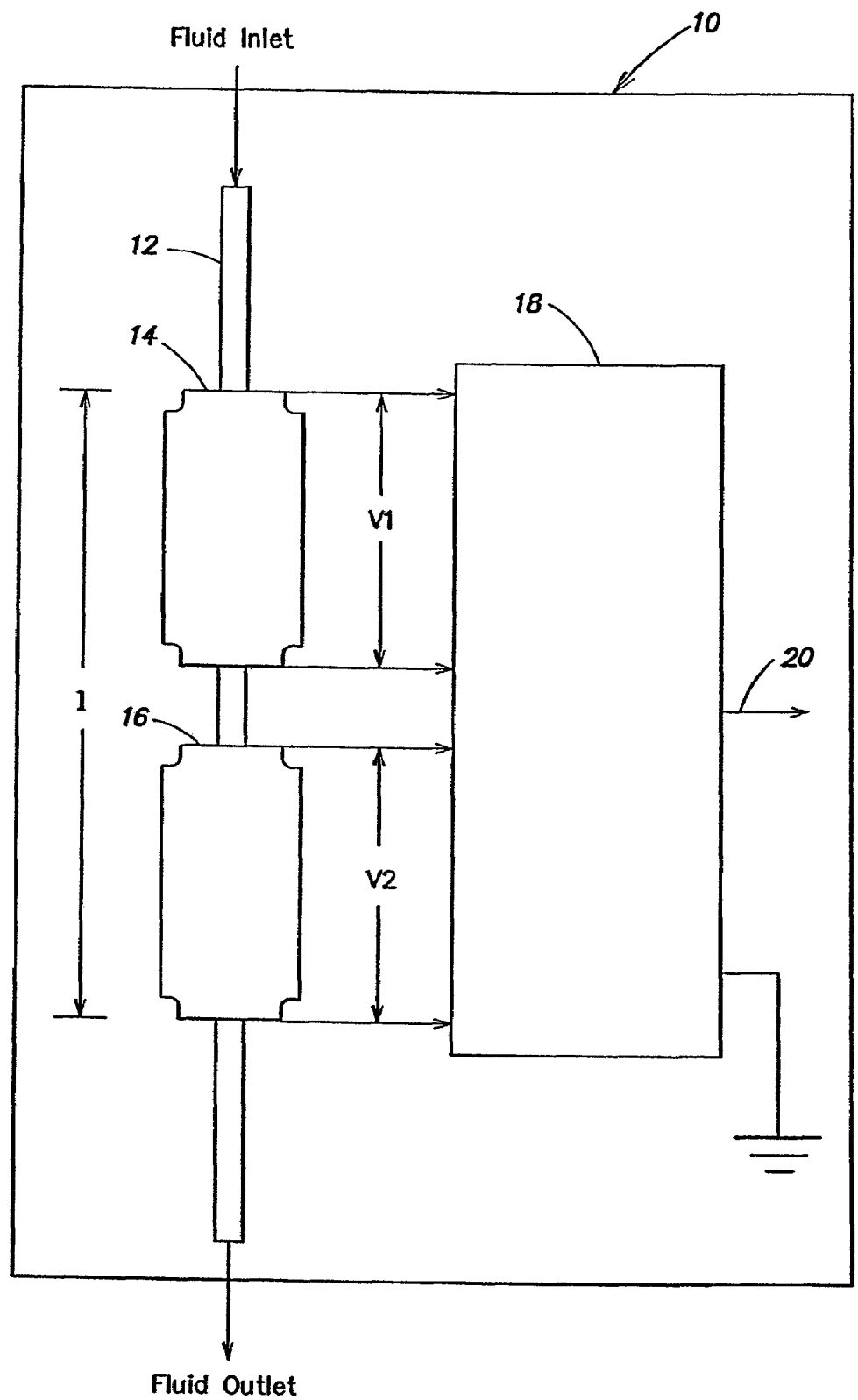
FIG. 1 illustrates a conventional thermal mass flow sensor.

Various aspects of the present invention derive from Applicant's identification and appreciation of a correlation between fluid sensor output curves and a characteristic curve of a sensor when the sensor is modeled with a transfer function operating on flow rate, at least one sensor property and at least one fluid property. The correlation facilitates accurately determining flow rates of an arbitrary fluid by employing response information obtained during calibration with a test fluid and a model of the sensor.

According to one aspect of the present invention, a method of generating characteristic information of a sensor with a test fluid is provided. The method comprises acts of measuring a flow rate of the test fluid through a sensor conduit of the sensor for each of a plurality of sensor output values, converting each flow rate to an operand value based on at least one sensor property and at least one first property of the test fluid, mapping each of the plurality of sensor output values to a characteristic value based on at least one second property of the test fluid and storing at least one representation associating each operand with the respective characteristic value.

According to one embodiment, the act of converting each flow rate and the act of mapping each of the plurality of sensor output values are performed in accordance with the relationship:

$$W\left(g \cdot \frac{\rho Q L}{A} \cdot \frac{c_p}{\kappa}\right) = f \cdot \frac{S}{\kappa},$$

wherein $\rho$ is a density of the test fluid, Q is a volumetric fluid flow rate, L is a characteristic length of the sensor conduit, A is a cross-sectional area of the sensor conduit, $c_p$ is a specific heat of the test fluid, $\kappa$ is a thermal conductivity of the test fluid and $f$ and $g$ are fluid dependent constants.

According to another aspect of the present invention, a method of generating response information of a sensor with a test fluid for operation with an arbitrary fluid is provided. The method comprises acts of measuring a flow rate of the test fluid through a sensor conduit of the sensor for each of a plurality of sensor output values, recording each flow rate in association with a respective one of the plurality of sensor output values, storing a first mapping configured to convert sensor output values resulting from flow of an arbitrary fluid through the sensor conduit to characteristic values based on at least one property of the arbitrary fluid, and storing a second mapping configured to convert the flow rates to operand values based on at least one sensor property and at least one property of the test fluid.

In one embodiment, the act of storing the second mapping includes an act of storing a second mapping configured to convert flow rates to operand values in accordance with the relationship:

$$\Phi = g \cdot \frac{\rho Q L}{A} \cdot \frac{c_p}{\kappa}$$

wherein $\Phi$ is the operand value, $\rho$ is a density of the test fluid, Q is a volumetric fluid flow rate, L is a characteristic length of the sensor conduit, A is a cross-sectional area of the sensor conduit, $c_p$ is a specific heat of the test fluid, $\kappa$ is a thermal conductivity of the test fluid and g is a fluid dependent constant and the act of storing the first mapping includes an act of storing a first mapping configured to convert sensor output values to characteristic values in accordance with the relationship:

$$c = f \cdot \frac{S}{\kappa},$$

wherein c are the characteristic values, S are the sensor output values, κ is a thermal conductivity of the arbitrary fluid and f is a fluid dependent constant.

According to a further aspect of the present invention, a method of predicting flow rates of a process fluid through a sensor conduit with a flow sensor including at least one representation of a characteristic function of the sensor obtained during calibration with a test fluid is provided. The method comprises acts of providing a sensor output related to a flow rate of the process fluid through the conduit, mapping the sensor output value to a characteristic value based on at least one first property of the process fluid, obtaining an operand value including a flow rate component, at least one sensor property component and at least one fluid property component by indexing the at least one representation of the characteristic function with the characteristic value, and determining the flow rate component of the operand value using at least one property of the sensor and at least one second property of the process fluid to provide an indication of the flow rate of the process fluid through the sensor conduit.

According to another aspect of the present invention, a sensor model is provided that may be used for predicting flow rates of an arbitrary fluid through a sensor from sensor output values resulting from flow of the arbitrary fluid through the sensor. The model comprises an operand including flow rate, at least one sensor property and at least one first fluid property of the arbitrary fluid and a transfer function that, when operating on values of the operand, produces a sensor characteristic curve related to the sensor output values by at least one second fluid property of the arbitrary fluid.

According to another aspect of the present invention, a computer readable medium is encoded with a representation of a characteristic function and a program for execution on at least one processor. The program, when executed on the at least one processor, performs a method of converting a sensor output signal resulting from flow of a process fluid to a flow signal. The method comprises acts of receiving as an input a sensor output value related to a sensor output signal from a flow sensor, converting the sensor output value to a characteristic value based on at least one first property of the process fluid, obtaining an operand value including at least one sensor property and at least one fluid property associated with the characteristic value from the representation of the characteristic function, and determining a flow rate value of the process fluid from the operand value using at least one sensor property value and at least one process fluid property value.

Another aspect of the present invention is directed to a data structure to store a representation of a characteristic function of a flow sensor obtained during calibration of the flow sensor on a test fluid. The data structure comprises a plurality of entries, each entry having a first field and a second field, wherein the first field identifies a characteristic value computed from a sensor output value of the flow sensor based on at least one property of the test fluid and the second field identifies an operand value computed from a flow rate corresponding to the sensor output value, at least one property of the sensor and at least one property of the test fluid.

Another embodiment according to the present invention includes a computer readable medium adapted to electronically store information comprising an encoding of at least one representation of a characteristic function of a flow sensor obtained during calibration of the flow sensor with a test fluid.

Another embodiment according to the present invention includes a flow sensor comprising a conduit adapted to convey fluids, a circuit coupled to the conduit and configured to produce a sensor output signal indicative of a flow rate of a fluid through the conduit and at least one storage medium storing information including at least one representation of a characteristic function of the flow sensor.

According to another aspect of the present invention, a mass flow controller is provided. The mass flow controller comprises a flow sensor adapted to sense fluid flow in a flow path and provide a sensor output signal indicative of the mass flow rate in the flow path, a storage medium encoded with at least one representation of a characteristic function of the flow sensor, and a processor coupled to the flow sensor to receive the sensor output signal, the processor configured to convert the sensor output signal to a flow signal based on the characteristic function. The mass flow controller further comprises a controller coupled to the flow meter and adapted to provide a drive signal based at least in part on the flow signal, a valve actuator adapted to receive the drive signal from the controller and a valve coupled to the flow path. The valve is adapted to permit flow through the flow path depending on the displacement of a controlled portion of the valve.

DETAILED DESCRIPTION

Figure 2:
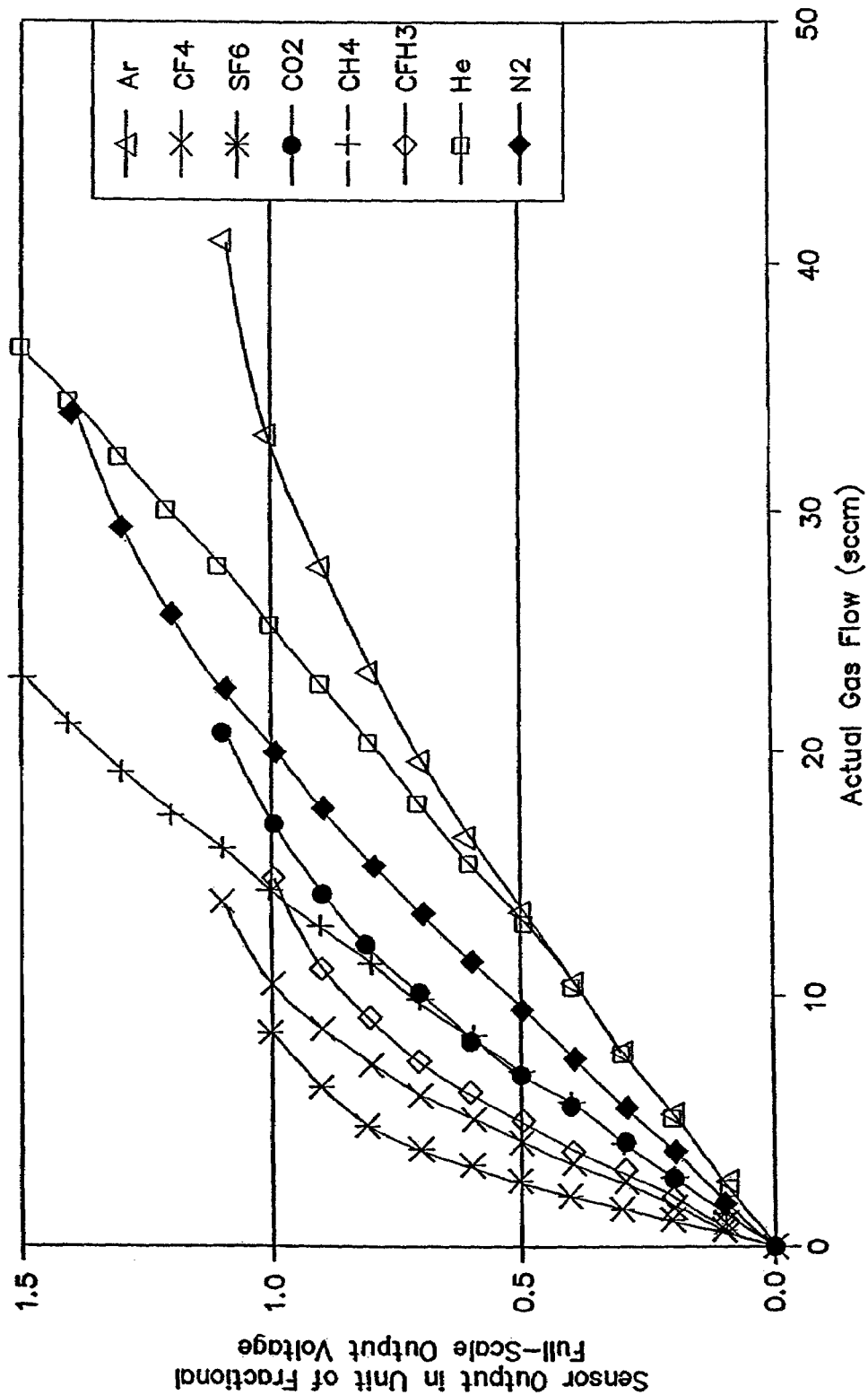
FIG. 2 illustrates representative sensor response curves resulting from the flow of eight fluids through a conventional thermal mass flow sensor of the prior art.

Methods have been proposed to address the difficulties that may result from variation in the behavior of a sensor when operating with different fluids. The variation may be influenced, in part, by the non-linear relationship between flow rate and sensor output. For example, restricting operation of the flow sensor to a linear range of a sensor response curve for a particular fluid may mitigate problems associated with the non-linearity of the sensor. As illustrated in FIG. 2, a sensor response curve for a particular fluid may have a portion that is approximately linear. By considering only flow rates within this limited range, sensor output values can be assumed to have an approximately linear, and thus predictable, relationship with the fluid flow.

However, a significant portion of a desired range of use of many of the sensor response curves lies outside the respective linear range and cannot be adequately approximated by a straight line. As such, limiting flow rates to the linear range of a given sensor response curve of a particular fluid may severely restrict the usefulness of a flow sensor to a very narrow range of applications and flow rates. For example, the linear range for the gas SF6 shown in FIG. 2 is less than 3 sccm. Outside this range, the behavior of the sensor is not directly predictable and may render the sensor unusable for applications requiring a wider range of flow rates.

The term "curve" refers generally to any representation of a function, distribution or relationship. For example, a curve may be a set of point pairs representing the relationship between two variables (e.g., a set of point pairs describing the relationship between sensor flow and sensor output). A curve may also be a mathematical, geometrical or other representation of a function. For example, a curve may be represented as a algebraic function (e.g., a polynomial), a trigonometric finction (e.g., a tangent curve), a piecewise approximation (e.g., a piecewise linear or conic approximation), a series sum of basis functions (e.g., splines or fourier coefficients), etc.

As illustrated in FIG. 2, the linear range of a sensor response curve may also depend on the fluid, that is, both the length and slope of a line that adequately approximates the linear portion of a sensor response curve may vary from fluid to fluid. Accordingly, the linear range for each fluid is generally established empirically by testing the fluid with a flow sensor during calibration at various known flow rates (e.g., measured by another flow measuring instrument) and measuring the sensor output. The term "calibration" refers generally to various tests and measurements made on a flow sensor to obtain information about the sensor and, more particularly, sensor response information. The information obtained during calibration may be used, for instance, to approximate the behavior of the sensor during operation. Typically, sensor calibration is carried out before the sensor is employed in the field (e.g., in an industrial application) and/or provided to a customer.

However, measuring the linear range for a variety of test fluids, for example, the eight test fluids shown in FIG. 2, is a labor intensive and time consuming procedure. Moreover, a linear range may have to be specifically computed for each of a set of fluids for which a sensor is intended to operate. In general, this type of customized calibration adds additional expense to the sensor calibration process. To complicate matters, many industrial applications operate flow sensors with process fluids having reactive, toxic and/or corrosive properties. These fluids may not be able to be handled and tested with during calibration of the flow sensor. Furthermore, which fluids a sensor will ultimately operate on in the field may not be known a priori.

To compensate for the inability to calibrate with a particular process fluid, either because a particular process fluid is unknown at the time of calibration or is dangerous to handle and/or harmful to the equipment, a flow sensor may be tested with a number of surrogate fluids during calibration. A surrogate fluid is generally a less corrosive and/or more generally available fluid having known properties used during calibration to obtain information about sensor behavior that may be subsequently used to approximate the response of the flow sensor operating on a process fluid known to have at least somewhat similar properties. The fluids illustrated in FIG. 2, for example, may be employed as surrogate fluids.

The term "process fluid" refers generally to any fluid on which a sensor operates or on which the sensor is intended to operate in the field for any of a variety of applications. In particular, a process fluid describes a fluid that may be used by the end user of a flow sensor. The term "test fluid" refers generally to any fluid used during calibration of a sensor, typically, in preparation for the operation of the sensor in the field.

It should be appreciated that test fluids and process fluids may not be different, that is, a particular test fluid used during calibration may be used in the field as a process fluid. For the purposes of this description, the terms generally describe whether a fluid is being used during calibration (i.e. a "test" fluid) or for operation in the field (a "process" fluid), and not necessarily to describe the type of fluid. As such, a surrogate fluid is at least a test fluid.

During calibration, a sensor may be tested with a number of test and/or surrogate fluids. In particular, for each surrogate fluid to be tested, the surrogate fluid may be introduced to a flow path coupled to a flow sensor at known flow rates and the sensor output recorded. This results in a sensor response curve for each surrogate fluid. The exemplary sensor response curves for a particular sensor for the fluids shown in FIG. 2 were obtained in this manner. Conventionally, surrogate sensor response curves have been employed to approximate flow rates from sensor outputs resulting from flow of a process fluid by assuming that sensor response curves of a process fluid may be related to one or more surrogate sensor response curves by a conversion factor. Conventional conversion factors are often based on the ratio between the molar specific heat of the process fluid and the molar specific heat of the most similar surrogate fluid.

Figure 3:
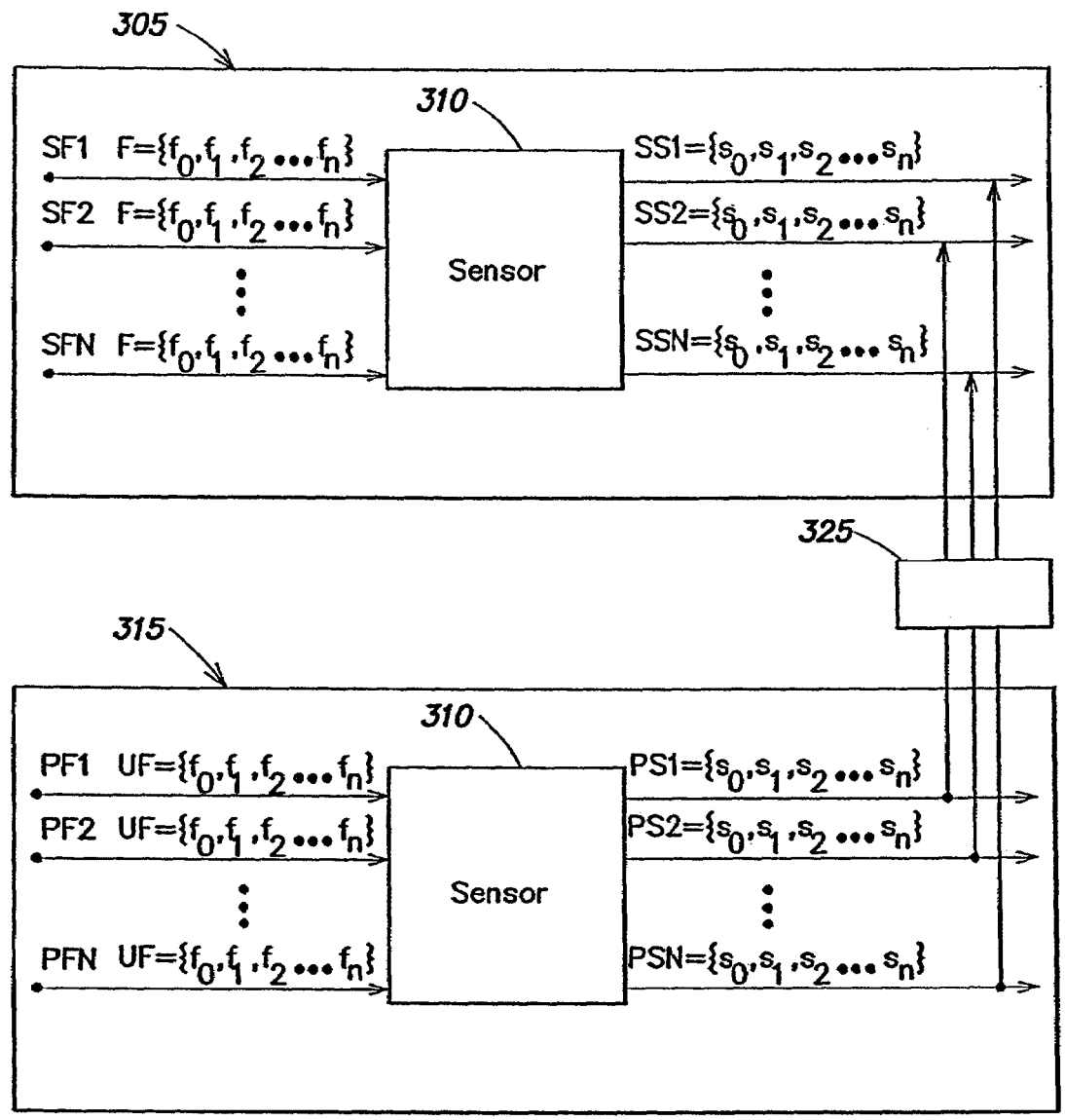
FIG. 3 illustrates a conventional method of employing surrogate fluid sensor response curves to correct sensor output values of a process fluid using conversion factors.

FIG. 3 illustrates how, conventionally, surrogate sensor response curves obtained during calibration may be employed to approximate flow rates during operation of the sensor on a process fluid. During calibration 305 of a sensor 310, each of a plurality of surrogate fluids SF1-SFN may be introduced to sensor 310 at a predetermined set of known flow rates F. Sensor 310 responds to the flow rates by providing surrogate sensor response curves SS1-SSN, respectively. The surrogate sensor response curves may then be recorded in association with the known flow rates F.

During operation 315 of sensor 310, it may be desirable for sensor 310 to operate on any of process fluids PF1-PFN. When any one of process fluids PF1-PFN is introduced to sensor 310 at unknown flow rates UF, the sensor responds with a corresponding process sensor response curve PS1-PSN, respectively. It is assumed that values of a process sensor response curve are related to values of one of the surrogate sensor response curves by the ratio of the molar specific heat of the process fluid and the molar specific heat of the surrogate fluid. This relationship is shown schematically as mapping 325. As such, sensor output values resulting from fluid flow of a process fluid may be mapped to associated values of a surrogate sensor response curve and an associated and/or interpolated flow rate from the known flow rates in set F may be used as an approximation of the unknown flow rate of the process fluid.

However, the relationship based on molar specific heats may only be valid within the linear range of the process fluid. That is, there may only be an accurate mapping between process sensor output values and values on the recorded surrogate sensor response curve in the linear range of the process fluid. Accordingly, accurate approximations of process fluid flow rates may only be achieved by the method described above when a sensor output value falls within the linear range of the sensor response curve of the process fluid. As discussed in the foregoing, this is a severe limitation on the applicability of a sensor.

Furthermore, it should be appreciated that in order to obtain accurate approximations, even in the linear range of a process fluid, a sufficiently similar surrogate fluid is required to be tested during calibration of the sensor. As a result, not only is it difficult to ensure that a sensor will operate adequately on an arbitrary process fluid, but the accuracy of the sensor will vary depending on the availability of an appropriate surrogate fluid. In addition, calibrating a sensor that operates generally on multiple process fluids may require time-consuming effort to measure and record response information (e.g., sensor response curves) for numerous surrogate fluids.

Applicant has appreciated that deficiencies in conventional conversion techniques derive from the insufficiency of empirical information to adequately describe the behavior of the sensor. Conventional conversion factors have been generated largely by experimentation and may not have any physical support. In particular, Applicant has identified that conversion factors based on sensor response information as a function of flow rate are incomplete general descriptions of the response of a sensor to arbitrary fluids.

Accordingly, Applicant has developed a physically based general sensor model describing the behavior of a sensor from properties of the sensor and fluid that may describe the response of a sensor to arbitrary fluids. Various aspects of the present invention derive from Applicant's identification and appreciation that a transfer function of a sensor may be characterized as operating on one or more properties of the sensor and one or more properties of a fluid in addition to flow rate to produce a single characteristic curve describing the response of the sensor. As such, response information obtained from a sensor during calibration may be utilized according to a sensor model to facilitate accurate prediction of flow rates of an arbitrary fluid both within and without the linear range of the fluid's sensor response curve.

Following below are more detailed descriptions of various concepts related to, and embodiments of, methods and apparatus according to the present invention. It should be appreciated that various aspects of the invention, as discussed above and outlined further below, may be implemented in any of numerous ways, as the invention is not limited to any particular manner of implementation. Examples of specific implementations are provided herein for illustrative purposes only.

In particular, various methods according to the present invention may be employed in conjunction with a variety of flow sensors including the flow sensor described in connection with FIG. 1 and/or the various flow sensors described in U.S. application Ser. No. 09/783,439, U.S. Application Ser. No. 60/397,139 and U.S. Application Ser. No. 60/436,207 which are herein incorporated by reference in their entirety. The present invention is not limited to any particular implementation or arrangement of a flow sensor.

Figure 4:
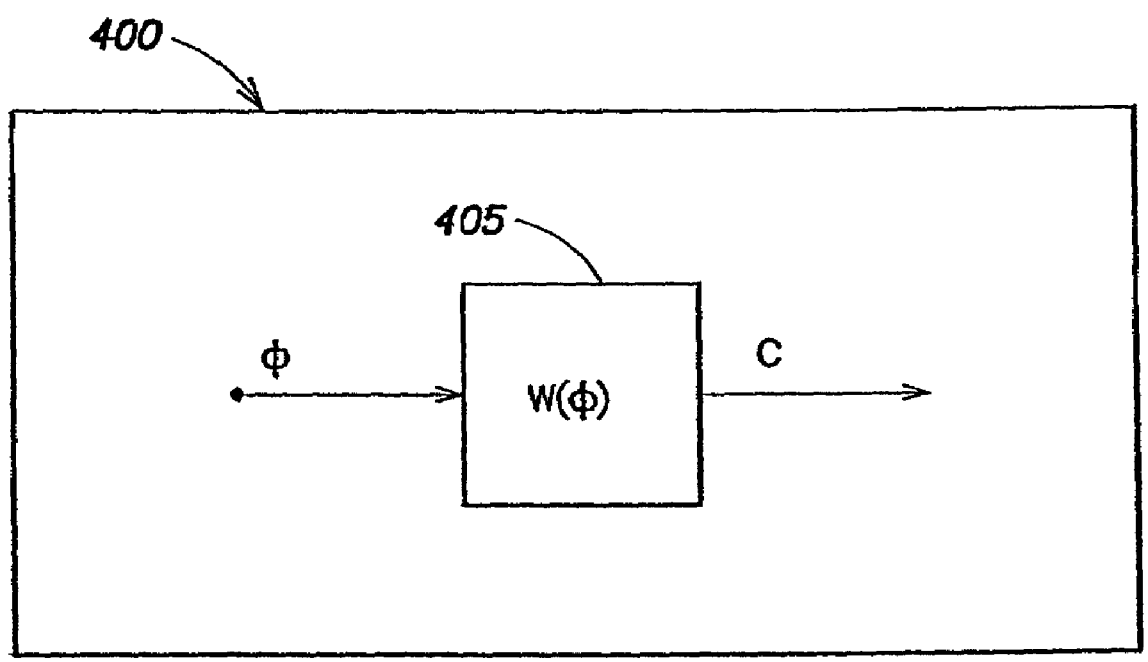
FIG. 4 illustrates one embodiment of a sensor model describing sensor behavior according to one aspect of the present invention.

FIG. 4 illustrates one embodiment of a sensor model according to the present invention. Sensor model 400 includes a characteristic function W that when operating on values of $\Phi$ provides characteristic curve C. The $\Phi$ operand may be any of various appropriate functions of flow rate, at least one property of the sensor, and at least one property of the fluid. By expanding the sensor model such that its transfer function 405 operates on values of the $\Phi$ operand, sensor model 400 incorporates sensor and fluid properties whereby the behavior of the sensor is accurately described by the model. The sensor model may be employed to accurately determine flow rates from the sensor output values resulting from operation on arbitrary processes fluids.

A transfer function of a sensor model operating on an operand including flow rate, at least one sensor property, and at least one fluid property that produces a characteristic curve that may be related to sensor output values of a sensor by at least one fluid property is referred to as a "characteristic function."

Figure 5:
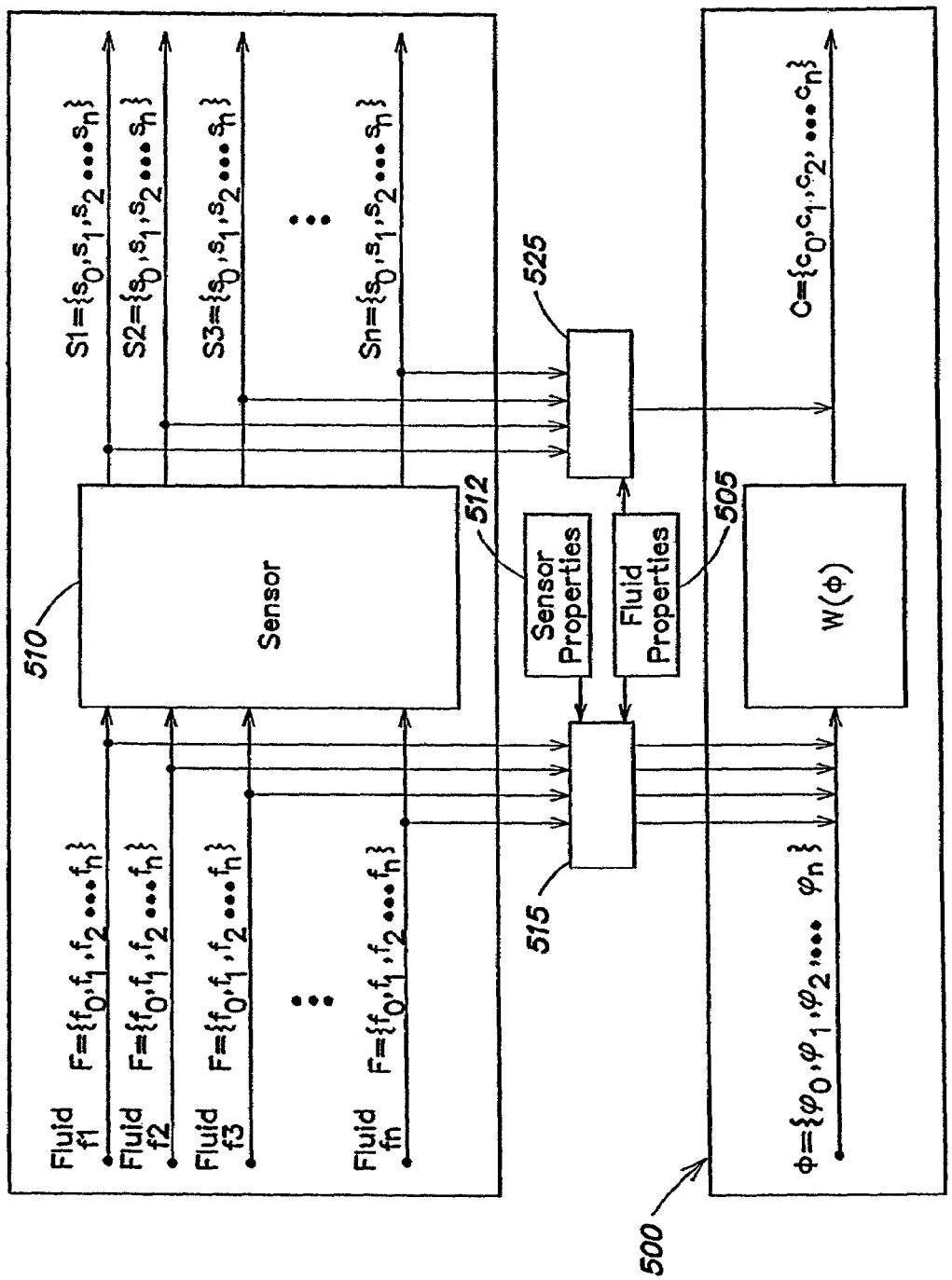
FIG. 5 illustrates how a sensor model may be employed to determine flow rates of an arbitrary fluid according to another aspect of the present invention.

FIG. 5 illustrates the relationship between a sensor 510 and one embodiment of a sensor model according to the present invention. When any of various fluids, for example, fluids f1, f2, f3 and/or fn are introduced to a sensor 510 at various flow rates F, sensor 510 may produce a different sensor response output curve, for example, S1, S2, S3 and Sn, for each fluid, respectively. According to sensor model 500, each of the sensor response curves is related to a characteristic curve C by a transform 525. Transform 525 may be any function or transform that relates the various sensor response curves to the characteristic curve C based on at least a property of the fluid associated with the respective sensor response curve. Fluid properties may include, but are not limited to, thermal conductivity, viscosity, specific heat, density, temperature, any combination or relationship thereof, etc.

For example, transform 525 may map each of sensor response curves S1, S2, S3 and Sn onto characteristic curve C. That is, a sensor output value resulting from a particular flow rate of a particular fluid may be mapped to a value along the characteristic curve by applying transform 525 according to sensor model 500.

The $\Phi$ operand of sensor model 500 may be any of various functions of flow rate, one or more sensor properties, and one or more fluid properties. Sensor properties may include physical dimensions of a sensor conduit, the configuration of the sensing elements of the sensor electronics, other various physical properties of a sensor, combinations of sensor characteristics, and/or relationships thereof that may influence flow. Since the $\Phi$ operand of model 500 is based on flow rate and properties of the sensor and fluid, transfer function W describes a characteristic function of sensor 510.

Furthermore, according to sensor model 500, a fluid flowing through a sensor at a particular flow rate will have an associated value of $\Phi$ that may be computed by applying transform 515. For example, an associated value of $\Phi$ for each of the flow rates F for fluid f1, f2, f3 and fn, etc., may be computed from properties of sensor 510 and properties of the respective fluid.

It should be appreciated that values along characteristic curve C can be mapped to associated values of $\Phi$ according to an inverse characteristic function $W^{-1}$, provided information on W is available and the characteristic function W is monotonic increasing or monotonic decreasing in a region of interest. That is, if a value $c_i$ along curve C is known, a corresponding value of $\Phi$ may be computed. As such, since the model establishes that transform 525 maps sensor response curves to the same characteristic curve C and values of $\Phi$ are a function of flow rate, a sensor output value produced by an arbitrary fluid flowing through a sensor may be used to back calculate a flow rate that would result in a characteristic value of $c_i$ according to the sensor model, provided a representation of characteristic function W is available.

The term "representation" refers generally to any numerical, analytical, mathematical and/or algorithmic description or approximation of a characteristic function. Exemplary representations include, but are not limited to, look-up tables (LUT), approximating functions such as splines, trigonometric or algebraic functions, series expansions, etc. In addition, a representation may include data and a set of operations and/or instructions on how to manipulate the data. For example, a representation may include a look-up table storing sensor response information (e.g., sensor output values in association with flow rate values) and one or more mapping operations adapted to convert the sensor response information to characteristic information (e.g., characteristic values in association with $\Phi$ operands).

Figure 6:
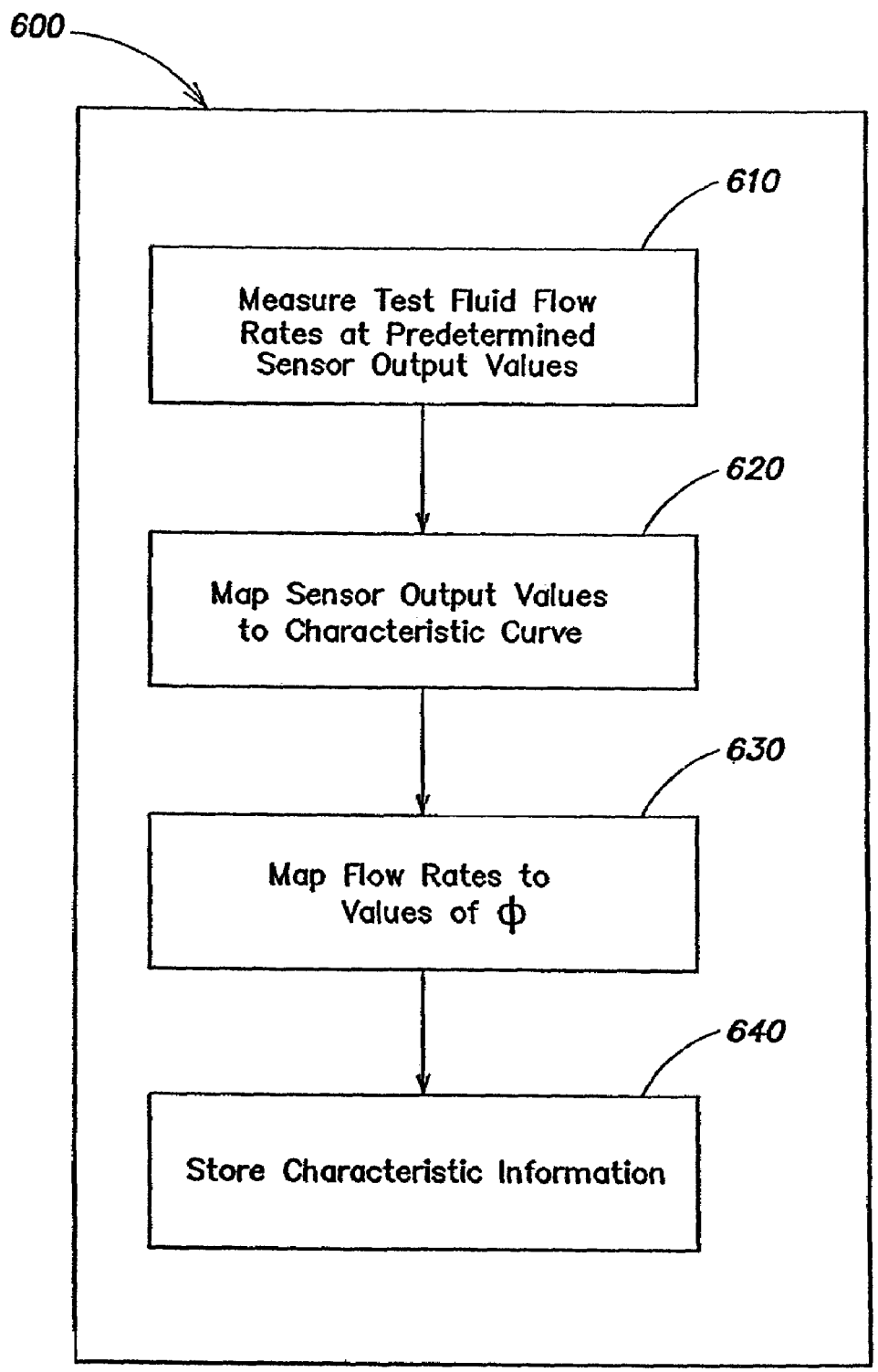
FIG. 6 illustrates a method of obtaining characteristic information during calibration of a sensor with a test fluid that may be used to determine flow rates of an arbitrary fluid during operation of the sensor according to another aspect of the present invention.

FIG. 6 illustrates one embodiment of a method according to the present invention that includes obtaining a representation of a characteristic function of a sensor model during calibration of a sensor on a single test fluid. The information obtained during calibration 600 may then be employed to facilitate approximating flow rates during operation of the sensor on an arbitrary fluid. During calibration, a sensor may be coupled to various calibration equipment adapted to introduce fluids to a conduit of the sensor at adjustable and measurable flow rates.

In step 610, a test fluid having known thermal and/or physical properties is introduced to a sensor at a number of desired sensor output values. For example, an operator may adjust the calibration equipment such that the flow rate of the test fluid causes the sensor to respond with a desired sensor output value. In one embodiment, the sensor output values are normalized, for example, by dividing sensor output values by the sensor output value at a nominal full scale flow through the conduit such that they represent fractions of full scale flow.

For example, the calibration equipment may be adjusted such that the sensor responds with a sensor output value of 0.1 (e.g., indicative of 10% of nominal full scale flow). The actual flow rate through the conduit of the sensor is then measured, for example, by a volume-displacement reference flow meter of the calibration equipment. The sensor output value and the associated actual flow rate may then be recorded. The flow rate of the test fluid may again be adjusted until the sensor responds with a second desired sensor output value, for instance, a sensor output value of 0.2 (e.g., indicative of 20% of nominal full scale flow). The actual flow rate is again measured and the pair of values recorded. This operation may be repeated until it has been determined that adequate sensor response information has been obtained for the test fluid.

In step 620, the sensor output values recorded in step 610 are mapped to characteristic values according to the relationship between sensor response curves and the characteristic curve described by the sensor model being employed. The term "characteristic value" refers generally to values computed from a sensor output value produced in response to flow of a fluid by using at least one property of the fluid. A characteristic value is presumed to lie substantially along the characteristic curve of the sensor model. For example, the sensor output values recorded in step 610 may be mapped to characteristic values by multiplying the sensor output value by a property of the test fluid, for example, the thermal conductivity of the test fluid.

In step 630, the actual flow rates recorded in step 610 are mapped to values of the $\Phi$ operand based on properties of the sensor and the test fluid according to the sensor model being employed. In step 640, the values of the $\Phi$ operand computed from the recorded actual flow rates in step 630 and the characteristic values computed in step 620 from the predetermined set of sensor output values corresponding to the actual flow rates are stored in association with one another, for example, in an LUT.

Accordingly, during calibration, characteristic values of a test fluid are recorded as a function of $\Phi$, that is, a representation describing the characteristic function of the sensor has been obtained. This characteristic information may be used to accurately determine the actual flow rate of an arbitrary process fluid from sensor output values obtained from the sensor operating with the process fluid. The term "characteristic information" refers generally to information describing a characteristic function of a sensor and, more particularly, to a representation of the characteristic function. For example, characteristic information may include, but is not limited to, any of various data structures such as look-up tables, approximating functions such as splines, parametric curves, trigonometric or algebraic approximations, etc.

It should be appreciated that test fluid flow rates and test fluid sensor output values need not be mapped to characteristic values and operand values, respectively, during calibration. For example, the values obtained in step 610 may be stored in a look-up table or other suitable data structure as sensor response information. The sensor response information may be subsequently converted to characteristic information during operation of the sensor on an arbitrary fluid. That is, steps 620 and 630 may be carried out during operation of the sensor instead of during calibration provided the appropriate mapping has been stored or otherwise been made available to the sensor during operation. Storing the sensor response information and converting it to characteristic information according to a sensor model during operation may facilitate operation of the sensor with various sensor models without requiring the sensor to be re-calibrated.

Figure 7:
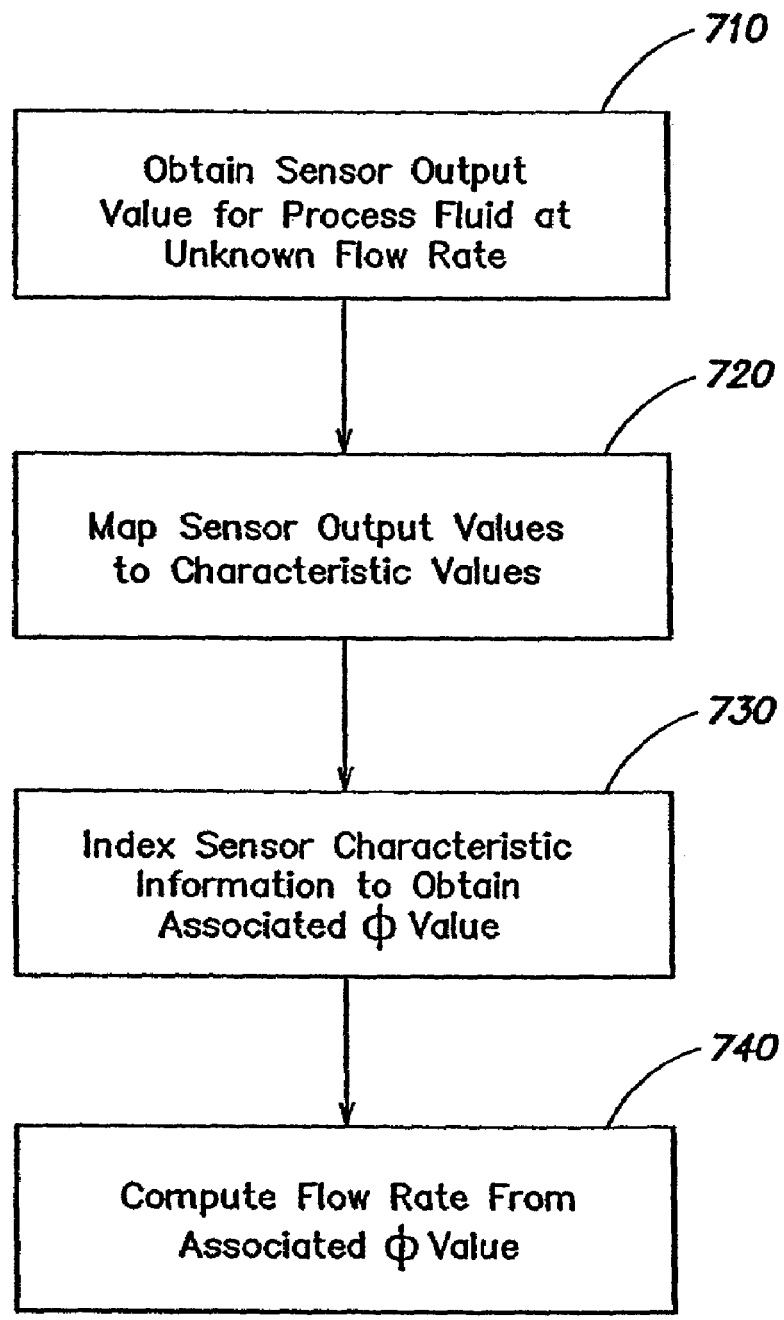
FIG. 7 illustrates a method of employing characteristic information obtained during calibration of a sensor on a test fluid to determine flow rates of an arbitrary fluid during operation of the sensor from sensor output values resulting from fluid flow of the arbitrary fluid according to another aspect of the present invention.

FIG. 7 illustrates one method of employing sensor characteristic information to determine an unknown flow rate of an arbitrary process fluid directly from sensor output values provided by the sensor. In step 710, a process fluid is introduced to a sensor at an unknown flow rate. For example, the flow sensor may be employed to measure the flow in an industrial control application wherein knowledge of the fluid flow through the sensor is used in a feedback loop to deliver a precise amount of fluid to a process chamber. The sensor may respond to the unknown flow rate by producing a sensor output value indicative of the flow rate, for example, according to principles of heat convection as described in connection with FIG. 1.

In step 720, the sensor output value is mapped to a characteristic value substantially along a characteristic curve of the sensor according to a mapping described by the sensor model, for example, as described in step 620 of FIG. 6. It should be appreciated that, typically, the same sensor model used to obtain characteristic information about the sensor during calibration is employed in predicting flow rates during operation of the flow sensor.

In step 730, the characteristic value is used to reference the characteristic information in order to, ultimately, obtain a flow rate associated with the characteristic value. For example, a LUT obtained by the method described in FIG. 6 may be indexed with the characteristic value to obtain the associated $\Phi$ operand. Since the sensor model establishes that characteristic values computed from sensor output values of different fluids lie on the same characteristic curve, a representation of which was recorded during calibration of the sensor on the test fluid, the characteristic value computed in step 720 will have an associated $\Phi$ operand that may be obtained from the representation of the characteristic function.

Indexing characteristic information or a representation of a characteristic function with a characteristic value refers generally to using the characteristic value to determine an operand value associated with the characteristic value according to the sensor model, that is, consistent with the representation of the characteristic function. It should be appreciated that indexing may include using the characteristic value to determine the associated operand value in a look-up table, as a parameter to an approximating and/or interpolating function representing the characteristic information, applying the characteristic value as an input variable to a function configured to determine an associated operand value, or any of various other methods designed to obtain an associated operand value from a representation of a characteristic function of the sensor with a characteristic value.

In step 740, the associated $\Phi$ operand is used to determine the unknown flow rate of the process fluid through the sensor that produced the sensor output value obtained in step 710. In particular, since the $\Phi$ operand is a function of flow rate and properties of the sensor and process fluid, the flow rate may be isolated from the $\Phi$ operand by applying known values associated with the configuration of the sensor and known process fluid properties to provide an accurate determination of the actual flow rate of the process fluid through the sensor.

As discussed above in connection with FIG. 6, in some embodiments, sensor response information is recorded during calibration along with operations for converting the sensor response information to characteristic information. Accordingly, flow rates and corresponding sensor output values stored in the sensor response information may be mapped to operand values and characteristic values, respectively, during operation of the sensor. For example, steps 620 and 630 described in connection with FIG. 6 may be part of the operation of the sensor as described in connection with FIG. 7.

Applicant has identified that sensor output curves of various fluids may be related to a characteristic curve of a sensor by the thermal conductivity of the fluid in a sensor model having a transfer function operating on flow rate and properties of the sensor and fluid, that is, operating on a Φ operand. For example, the Φ operand may be related to the Reynold's number associated with the characteristic flow of a particular sensor, for example, by considering the physical dimensions of the sensor conduit and/or the configuration of the sensor. The Reynold's number is often used to describe momentum, heat, and mass transfer to account for dynamic similarity and/or flow characteristics. The Reynold's number may take on various forms, for example, the Reynolds number may be expressed as:

$$Re = \frac{\rho Q L}{\mu A} \qquad \text{Eq. 1}$$

where, ρ is the density of the fluid, Q is the volumetric fluid flow rate, μ is the viscosity of the fluid, L is the characteristic length of the sensor, and A is the cross-sectional area of the sensor conduit. The characteristic length L may be related to the distance between sensing elements coupled to the sensor conduit to detect flow, for example, related to the length l illustrated in FIG. 1. Accordingly, the Φ includes a flow rate component and a sensor property component.

In some embodiments, Φ may depend on the Prandtl number of a particular fluid flowing through the flow path. The Prandtl number of a fluid may be used to describe heat transfer in general and in particular heat convection. The Prandtl number of a fluid may be expressed as follows:

$$Pr = \frac{\mu \cdot c_p}{\kappa} \qquad \text{Eq. 2}$$

where, μ is the viscosity of the fluid, $c_p$ is the specific heat of the fluid and κ is the thermal conductivity of the fluid. In one embodiment, the Φ operand includes a flow rate component, a sensor property component and a fluid property component. For example, the Φ operand may be expressed in terms of the Reynolds number associated with a sensor and the Prandtl number associated with the fluid such that the characteristic function of the sensor is related to sensor output curves of various fluids by the thermal conductivity of the fluid.

According to one embodiment, the Φ operand includes both the Reynolds number associated with the flow of fluid through a sensor and the Prandtl number of the fluid flowing through the conduit, for example, by the relationship Φ=RePr. It should be appreciated that such a formulation considers the physical properties of the sensor and thermal and/or physical properties of the fluid. In addition, the above formulation is compelling in that the Φ operand is dimensionless.

For example, the expression Φ=RePr has the following units, $$Re \cdot Pr = \frac{\rho C_p}{k}\left[\frac{hr}{\text{ft}^2}\right] \cdot Q\left[\frac{\text{cm}^3}{\min}\right] \cdot \frac{L}{A}\left[\frac{\text{ft}}{\text{ft}^2}\right] \qquad \text{Eq. 3}$$

When the units are made consistent and by using the fact that $$1 \text{ hour} = 60 \text{ min}\left(\text{i.e., } \frac{60 \text{ min}}{1 \, hr} = 1\right)$$

and $$1 \text{ ft} = 30.48 \text{ cm}\left(\text{i.e., } \frac{1 \text{ ft}}{30.48 \text{ cm}} = 1\right),$$

the physical units in the relationship shown in Eq. 3 cancel each other out as shown below.

$$Re \cdot Pr = \frac{\rho C_p}{k}\left[\frac{hr}{\text{ft}^2}\right] \cdot Q\left[\frac{\text{cm}^3}{\min}\right] \cdot \frac{L}{A}\left[\frac{\text{ft}}{\text{ft}^2}\right] \cdot \left[\frac{60 \min}{1 \, hr}\right] \cdot \left[\frac{1 \text{ ft}}{30.48 \text{ cm}}\right]^3 \qquad \text{Eq. 4}$$

As a result, the formulation results in the dimensionless relationship, $$Re \cdot Pr = \frac{\rho C_p}{k} \cdot Q \cdot \frac{L}{A} \cdot (0.00211888) \qquad \text{Eq. 5}$$

It should be appreciated that Q may be isolated from Eq. 5, such that flow rates may be computed directly from the Φ operand, that is, the flow rate component may be separated from the Φ operand provided the necessary sensor and fluid properties are available.

Figure 8:
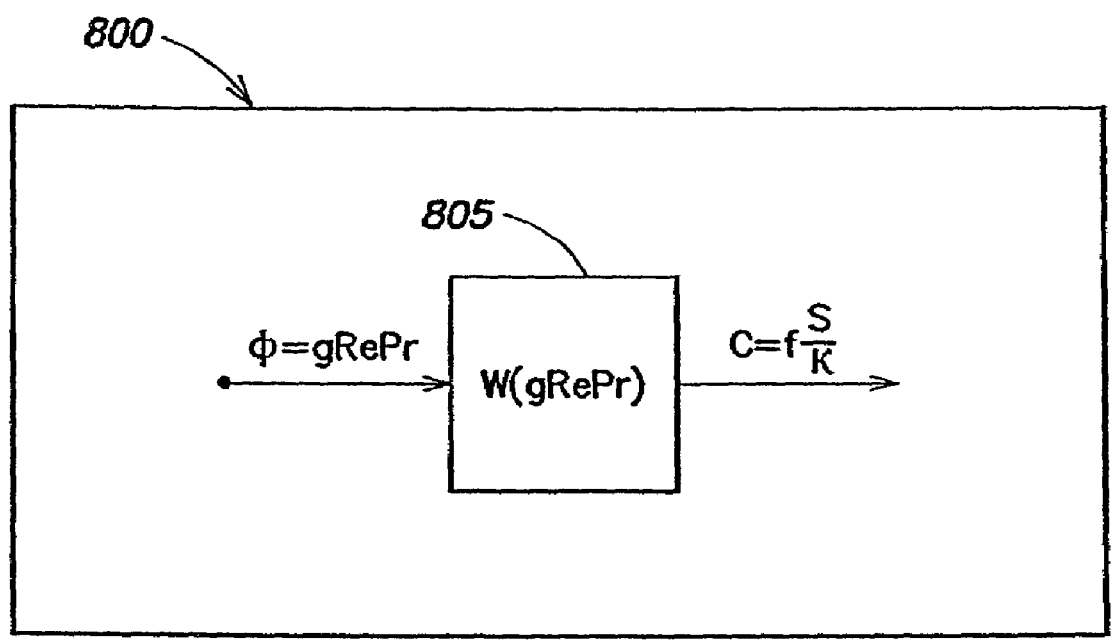
FIG. 8 illustrates another embodiment of a sensor model describing sensor behavior according to an aspect of the present invention.

FIG. 8 illustrates one embodiment of a sensor model according to the present invention. In sensor model 800, the Φ operand is a scaled product of the Reynolds number of a particular sensor and the Prandtl number for a particular fluid. The scale factor g may be a fluid dependent value established, for example, from empirical data obtained about the sensor operation with various fluids. A fluid dependent scale factor refers generally to a scalar value empirically or analytically derived that increases the alignment between characteristic values of a particular fluid and a characteristic curve of the sensor.

It should be appreciated that a scale factor need not be used, that is, scale factor g may be considered to be unity. The transfer function 805 of sensor model 800 is described as characteristic function W operating on values of Φ that produces a characteristic curve related to the sensor output values. In particular, according to sensor model 800, sensor response curves for different fluids are related to the same characteristic curve of the sensor by their respective thermal conductivity and a fluid dependent scale factor f. As with fluid dependent scale factor g, f may be eliminated by assuming that it takes a value of one.

Figure 9:
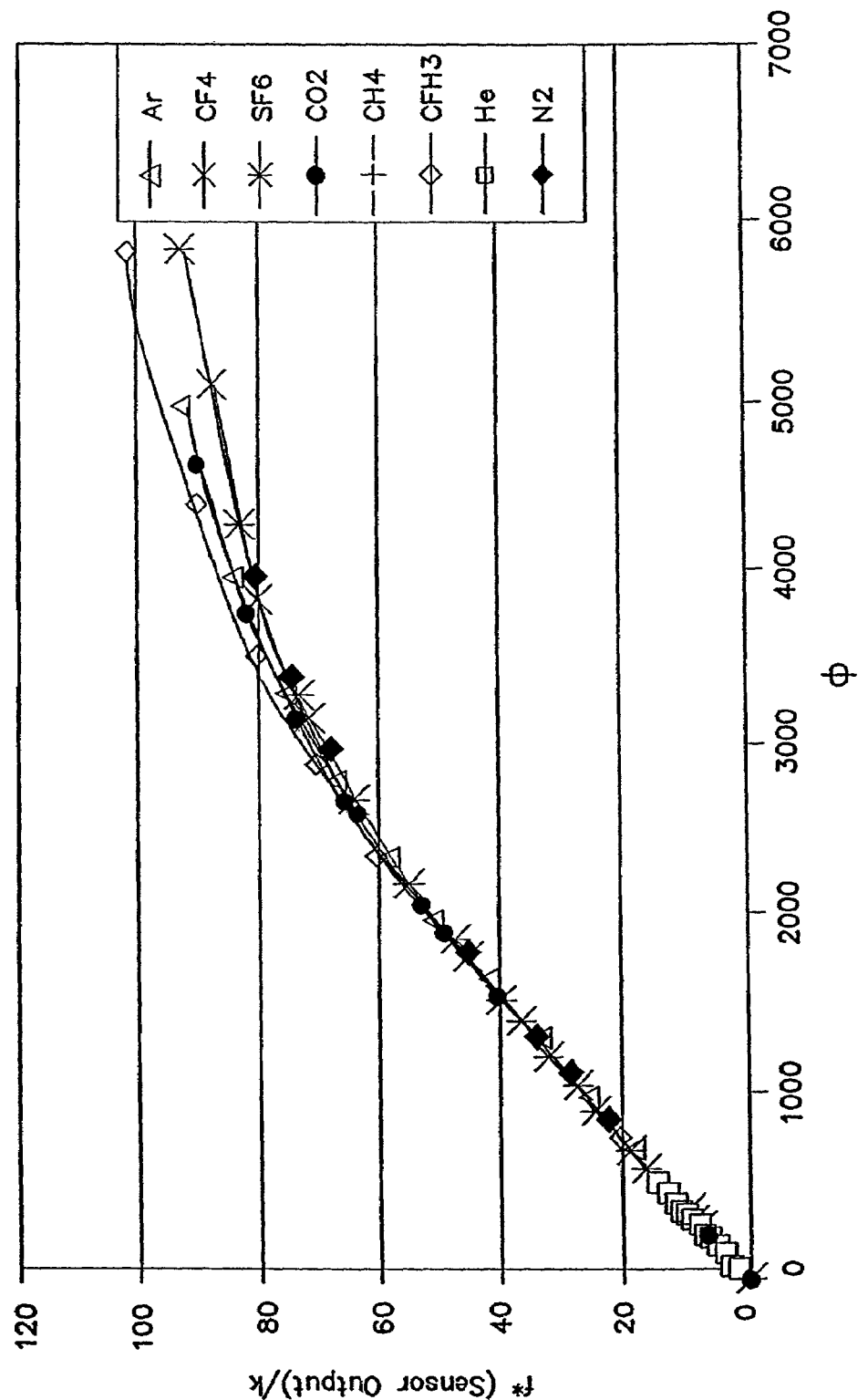
FIG. 9 illustrates sensor response curves of various fluids mapped to characteristic values according to the embodiment of the sensor model illustrated in FIG. 8 using unity scale factors.

FIG. 9 illustrates sensor response curves of the eight fluids of FIG. 2 mapped to characteristic values and plotted as a finction of the Φ operand according to the sensor model 800 illustrated in FIG. 8 without using scale factors f and g (e.g., by assuming unity scale factors). In particular, each sensor response curve for the fluids shown in FIG. 2 were divided by their respective thermal conductivity and plotted as a function of the product of the Reynold's number associated with the sensor and the Prandtl number associated with the fluid. It should be appreciated that the exemplary fluids shown cover a wide range of fluids having substantially different thermal physical properties. However, the characteristic values of the various sensor response curves substantially collapse to a single characteristic curve of the sensor as predicted by sensor model 800.

Figure 10:
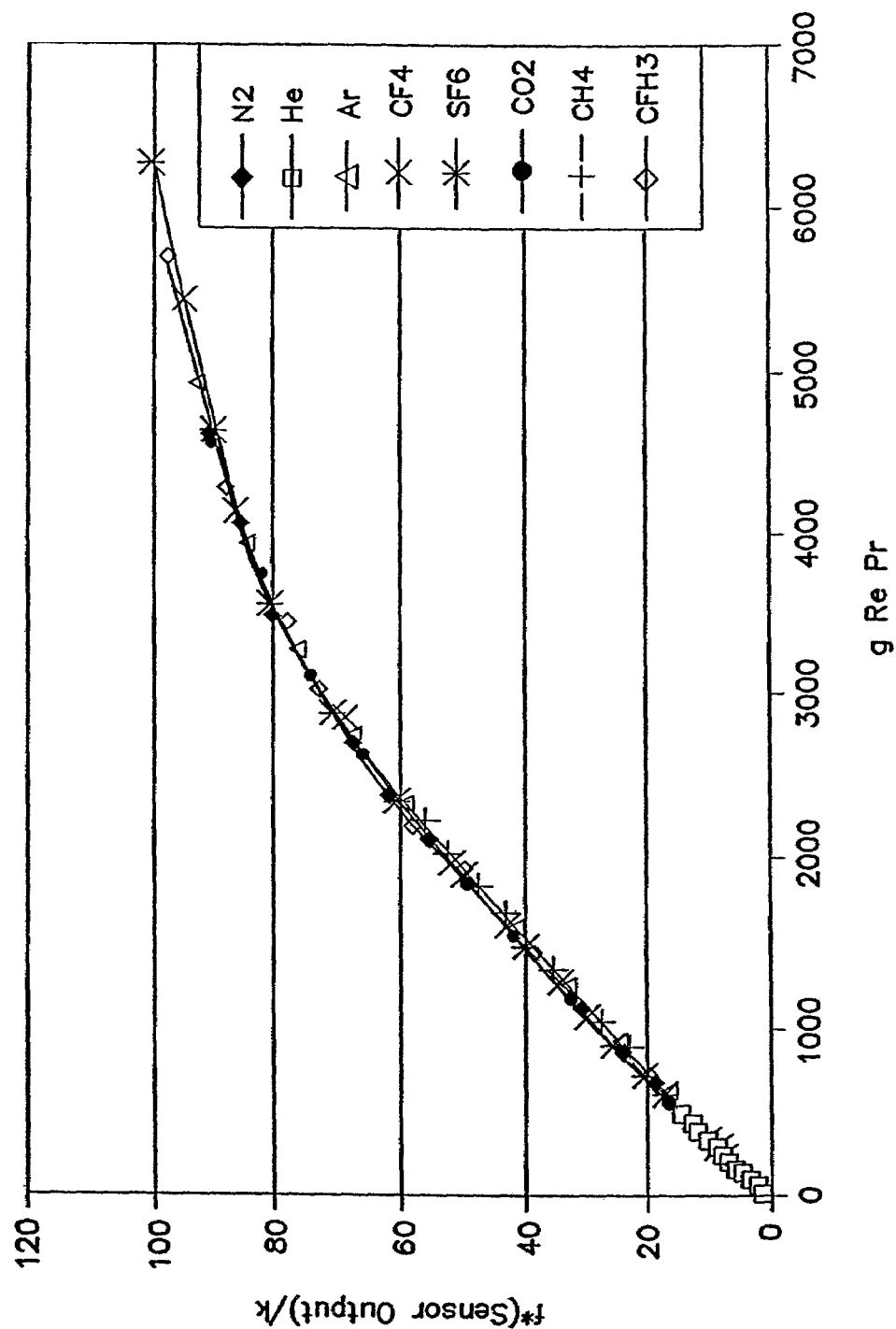
FIG. 10 illustrates sensor response curves of various gases mapped to characteristic values according to the embodiment of the sensor model illustrated in FIG. 8 using fluid dependent scale factors.

FIG. 10 illustrates the same sensor response curves mapped to characteristic values according to the characteristic function W illustrated in FIG. 8 using fluid dependent scale factors f and g, the values of which are listed in Table 1 below. The use of fluid dependent scale factors f and g further aligns the mapped sensor response curves with the characteristic curve of the sensor. As such, sensor model 800 provides a robust description of the behavior of the sensor that may be employed to determine flow rates for any fluid for which the appropriate thermal and/or physical properties are available.

TABLE 1

| Fluid | f | g |
|---|---|---|
| N2 | 1.05 | 1.04 |
| He | 1.0 | 1.0 |
| Ar | 1.0 | 1.0 |
| CH4 | 1.0 | 1.0 |
| CO2 | 1.0 | 1.0 |
| CF4 | 1.08 | 1.08 |
| CHF3 | 0.98 | 0.96 |
| SF6 | 1.08 | 1.08 |

It should be appreciated that a characteristic curve is a construct of the sensor model. How closely sensor output values map to this curve depends on how well the model describes the behavior of the sensor. As illustrated in FIG. 10, sensor output values for the various exemplary fluids align with the underlying characteristic curve even well outside the linear range of the respective fluids. As such, the response of a sensor to a fluid may be accurately determined over an extended range of flow rates, and not just over the linear range of the fluid.

Furthermore, since each sensor response curve may be mapped substantially to the same curve, response information from a single test fluid may be sufficient to describe the underlying characteristic curve. Accordingly, characteristic information may be computed from a single test fluid either during calibration or during operation of the sensor which may be used to determine the response of the sensor on arbitrary fluids across an extended range of flow rates.

Figure 11:
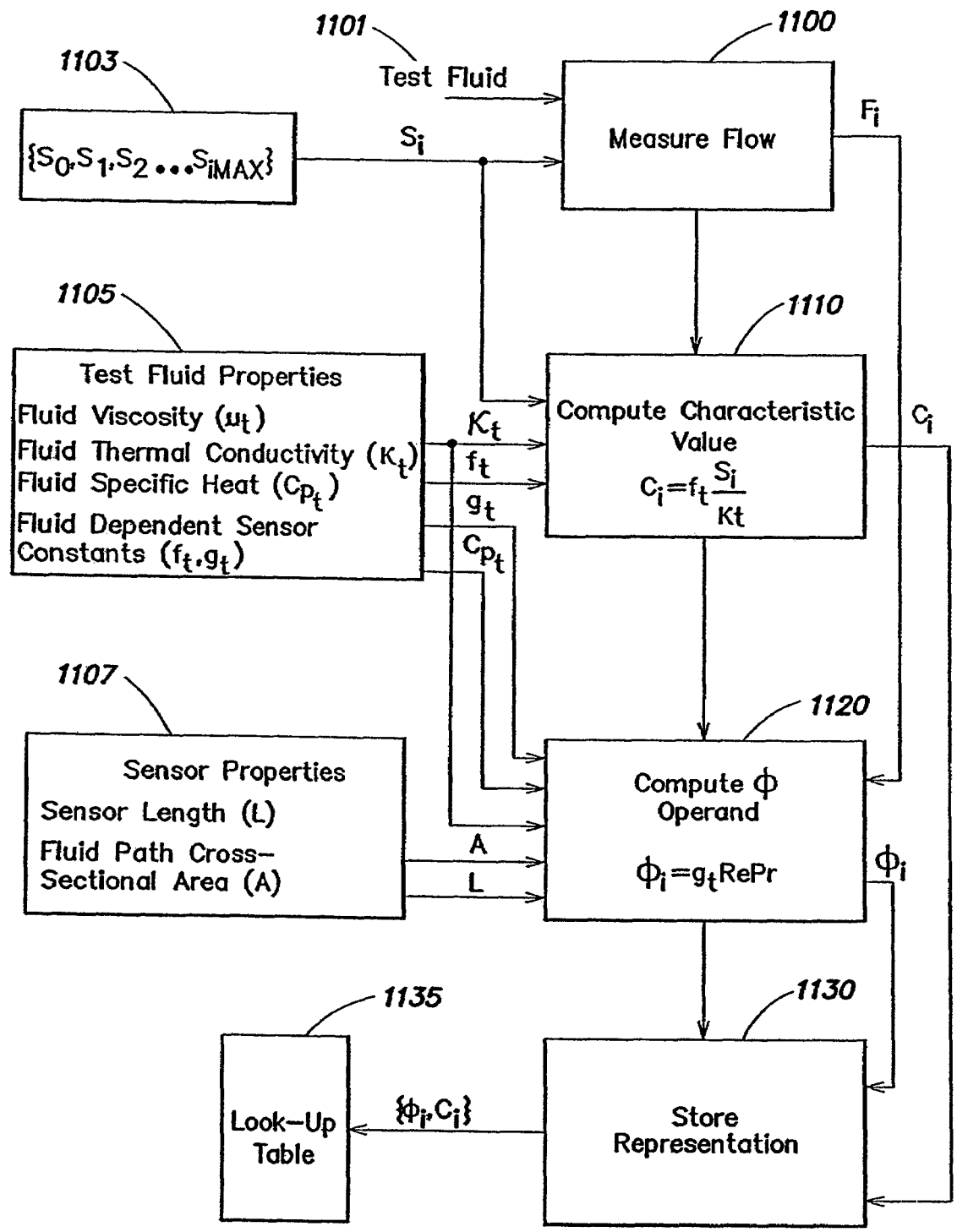
FIG. 11 illustrates another method of obtaining characteristic information during calibration of a sensor with a test fluid that may be used to determine flow rates of an arbitrary fluid during operation of the sensor according to another aspect of the present invention.

FIG. 11 describes one embodiment according to the present invention of a method of calibrating a flow sensor on a single test fluid to obtain characteristic information about the sensor according to sensor model 800. The characteristic information facilitates subsequent operation of the sensor on an arbitrary fluid by providing a predictive model of the behavior of the sensor. For example, the method described below may be employed during calibration of a flow sensor for use in an MFC configured to control the flow of a plurality of process fluids, one or more of which may not be available or known at the time of calibration. Moreover, the MFC may be employed in applications requiring flow rates substantially outside the linear range of the process fluids for which it is intended to operate.

In step 1100, a test fluid 1101 having a known thermal conductivity and molar specific heat is introduced to a conduit of a sensor having a known cross-sectional area and characteristic length. As illustrated in FIG. 1, the characteristic length of the sensor conduit may be related to the length l formed by the two coils 14 and 16 and the spacing between them. The known properties discussed above may be, for example, stored in a database 1105 of fluid properties and a database 1107 of sensor properties.

As discussed in more detail below, sensor and fluid property information as well as information obtained during calibration, may be stored on any computer readable medium such as a memory included in the sensor, a component using the sensor such as an MFC, one or more computers coupled to the sensor and/or MFC, or anywhere else that information may be made available.

Table 2 illustrates values for eight exemplary fluids that may be stored, for example, in databases 1105 and 1107.

TABLE 2

| | | | Sensor and Fluid Properties | | | | | | | |
|---|---|---|---|---|---|---|---|---|---|---|
| Symbol | Property | Unit | N2 | He | Ar | CF4 | SF6 | CO2 | CH4 | CHF3 |
| Mw | Fluid Molecular Weight | | 28.013 | 4.003 | 39.950 | 88.000 | 146.050 | 44.100 | 16.043 | 70.000 |
| $\rho$ | Fluid density | lbm/ft$^3$ | 0.060196 | 0.0086 | 0.08585 | 0.1891 | 0.31384 | 0.09477 | 0.03447 | 0.15042 |
| Cp | Fluid Specific Heat | Btu/lbm-F. | 0.249169 | 1.24176 | 0.12439 | 0.18309 | 0.17749 | 0.21514 | 0.57888 | 0.19398 |
| k | Fluid conductivity | Btu/hr-ft-F. | 0.017157 | 0.09691 | 0.01182 | 0.01251 | 0.01075 | 0.01218 | 0.02497 | 0.00981 |
| $\mu$ | Dynamic viscosity | lbm/ft-sec | 1.18E−05 | 1.31E−05 | 1.50E−05 | 1.15E−05 | 9.70E−06 | 9.92E−06 | 7.37E−06 | 9.72E−06 |
| Pr | Prandtl No. | | 0.715 | 0.693 | 0.666 | 0.706 | 0.723 | 0.765 | 0.723 | 0.848 |
| $\rho$Cp/κ | | hr/ft$^2$ | 0.874 | 0.110 | 0.904 | 2.768 | 5.184 | 1.674 | 0.799 | 2.975 |
| L | Sensor Length | Ft | 0.067 | 0.067 | 0.067 | 0.067 | 0.067 | 0.067 | 0.067 | 0.067 |
| D | Sensor ID | Ft | 1.17E−03 | 1.17E−03 | 1.17E−03 | 1.17E−03 | 1.17E−03 | 1.17E−03 | 1.17E−03 | 1.17E−03 |
| A | Cross-Sectional Area | ft$^2$ | 1.07E−06 | 1.07E−06 | 1.07E−06 | 1.07E−06 | 1.07E−06 | 1.07E−06 | 1.07E−06 | 1.07E−06 |
| Z | Compressibility Factor | | 0.9996 | 1.0004 | 0.9994 | 0.9983 | 0.9886 | 0.9995 | 0.9982 | 0.9921 |

A test fluid may be introduced to the conduit at a number of flow rates such that the sensor responds at a predetermined set S of sensor output values. For example, the sensor may be coupled to calibration equipment adapted to introduce a fluid to the sensor at adjustable flow rates, and that may accurately provide a measurement of the flow rates corresponding to each of the sensor output values in set S.

Initially, the flow rate of test fluid 1101 may be adjusted until the sensor responds with a value $S_t$, for example, $S_t$ may take on a value equal to 0.1 after any of various normalization calculations to indicate 10% of nominal full scale flow. The actual flow rate $F_i$ of test fluid 1101 through the conduit is then measured by the calibration equipment and recorded.

Table 3 below illustrates data obtained during an exemplary calibration of a sensor using nitrogen (N2) as a test fluid. The first column lists a set S of desired sensor output values. The second column lists the corresponding flow rate values measured by calibration equipment resulting from introducing nitrogen to the sensor such that each of the desired sensor output values shown in the first column were produced.

TABLE 3

(N2)

| Sensor Output | Flow Rate (sccm) |
|---|---|
| 0.000 | 0.000 |
| 0.100 | 1.842 |
| 0.200 | 3.709 |
| 0.300 | 5.571 |
| 0.400 | 7.443 |
| 0.500 | 9.339 |
| 0.600 | 11.281 |
| 0.700 | 13.297 |
| 0.800 | 15.412 |
| 0.900 | 17.653 |
| 1.000 | 20.007 |
| 1.100 | 22.677 |
| 1.200 | 25.647 |
| 1.300 | 29.211 |
| 1.400 | 34.011 |

In step 1110, sensor output value $S_i$ is mapped to a characteristic value substantially along the characteristic curve of the sensor according to sensor model 800. In particular, the sensor output value is divided by the thermal conductivity of the test fluid $\kappa_t$ and scaled by a scale factor of the test fluid $f_t$ to produce characteristic value $c_i$.

In step 1120, the flow rate $F_i$ measured in step 1100 is used in combination with sensor and fluid properties to compute the value of $\Phi$ associated with the sensor output value $S_i$. In particular, flow rate $F_i$ is multiplied by the product of the fluid density $\rho$ and the sensor characteristic length L, and divided by the product of the fluid viscosity $\mu$ of the test fluid and the cross-sectional area of the sensor conduit A to form a Reynolds number associated with flow through the sensor as expressed in equation 1. The computed Reynolds number may then be multiplied by the Prandtl number of the test fluid as expressed in equation 2 and scaled by a scale factor $g_t$ of the test fluid to produce $\Phi_i$.

In step 1130, the computed values of $c_i$ and $\Phi_i$ are stored in association, for example, as an entry in look-up table 1135. The look-up table may be stored in a memory, for example, in the storage medium encoded with sensor and fluid properties and/or sensor response information of the test fluid. The above described steps may be repeated for each desired sensor output value in the set S such that the plurality of associated values $\Phi_i$ and $c_i$ tabulated in look-up table 1135 form a representation of the characteristic function of the sensor. It should be appreciated that the characteristic information obtained from the single test fluid may suffice to describe the behavior of the sensor according to the model such that calibration on additional test fluids may be unnecessary.

Table 4 illustrates an exemplary look-up table computed during calibration of a sensor using N2 as a test fluid. The first two columns list the same values shown in Table 3. The third column lists values of each of the desired sensor output values in column one mapped to characteristic values according to the characteristic function of the sensor model demonstrated in FIG. 8. The fourth column lists values of each of the corresponding flow rates shown in column two mapped to an associated value of $\Phi$, based on the Reynolds number associated with sensor flow and the Prandtl number of nitrogen. It may not be necessary to store the information in the first and second column, as the final two columns provide a description of the characteristic function of the sensor that may be used to facilitate determining flow rates through the sensor operating on an arbitrary fluid as described in more detail below.

Alternately, the final two columns may not need to be stored since the response information in the first two columns can be converted to characteristic information according to a sensor model at any time. Accordingly, a LUT may include response information and instructions that perform a mapping from flow rates to $\Phi$ operands and sensor output values to characteristic values. The response information may thus be mapped to characteristic information during operation of the sensor in the field.

TABLE 4

(N2)

| Sensor Output (S) | Flow Rate (sccm) | f * (S/k) | g * (RePr) |
|---|---|---|---|
| 0.000 | 0.000 | 0.000 | 0 |
| 0.100 | 1.842 | 5.829 | 212.8 |
| 0.200 | 3.709 | 11.657 | 428.5 |
| 0.300 | 5.571 | 17.486 | 643.6 |
| 0.400 | 7.443 | 23.314 | 859.9 |
| 0.500 | 9.339 | 29.143 | 1078.8 |
| 0.600 | 11.281 | 34.971 | 1303.2 |
| 0.700 | 13.297 | 40.800 | 1536.1 |
| 0.800 | 15.412 | 46.628 | 1780.4 |
| 0.900 | 17.653 | 52.457 | 2039.4 |
| 1.000 | 20.007 | 58.285 | 2311.3 |
| 1.100 | 22.677 | 64.114 | 2619.7 |
| 1.200 | 25.647 | 69.943 | 2962.8 |
| 1.300 | 29.211 | 75.771 | 3374.6 |
| 1.400 | 34.011 | 81.600 | 3929.1 |

Figure 12:
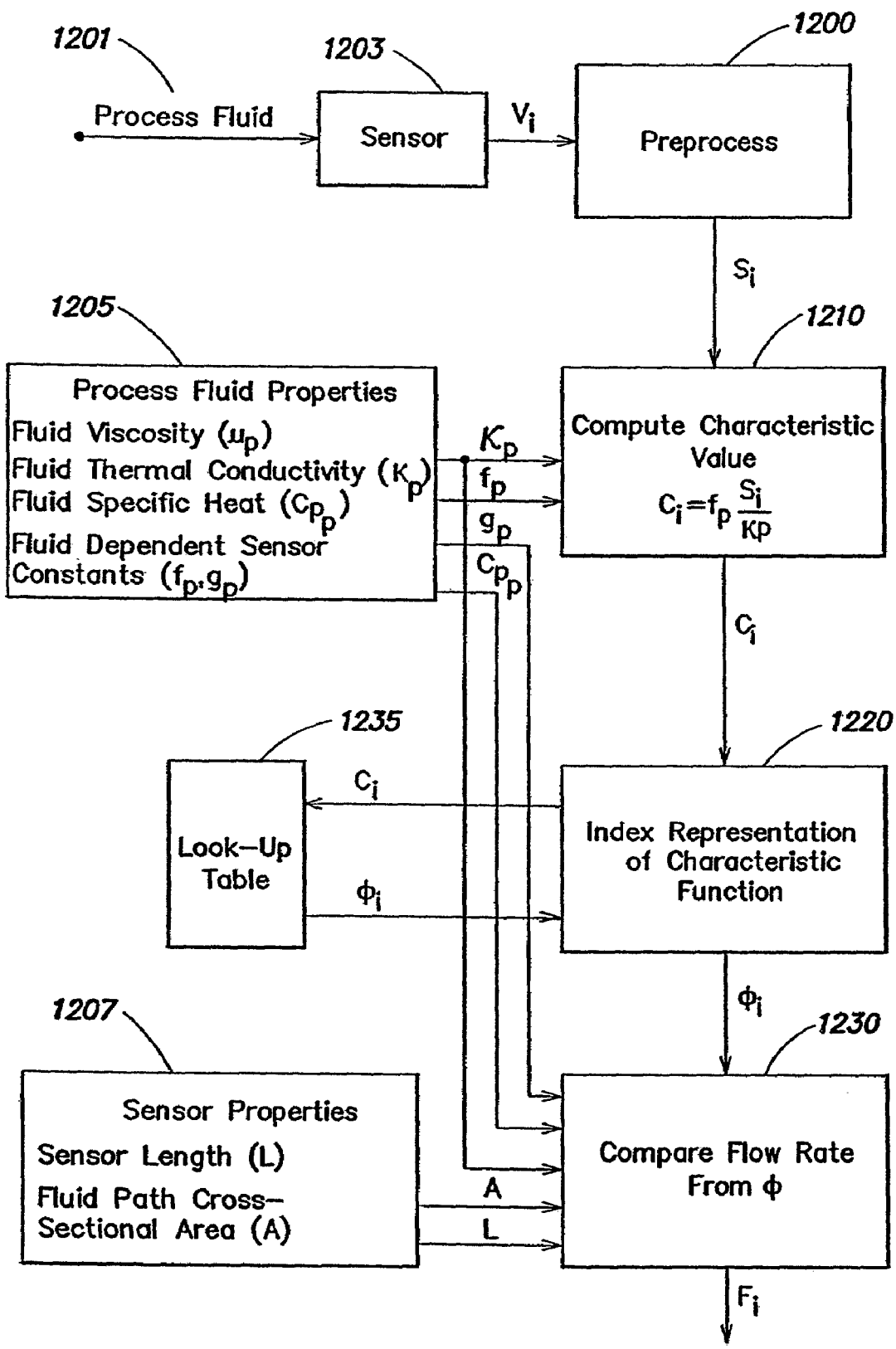
FIG. 12 illustrates another method of employing characteristic information obtained during calibration of a sensor on a test fluid to determine flow rates of an arbitrary fluid during operation of the sensor from sensor output values resulting from fluid flow of the arbitrary fluid according to another aspect of the present invention.

FIG. 12 illustrates one method according to the present invention of determining flow rates of an arbitrary fluid by employing a representation of the characteristic function of the sensor obtained during sensor calibration. For example, the look-up table obtained during the calibration on a single test fluid as described in connection with FIG. 11 may be used to determine flow rates of an arbitrary process fluid 1201.

Process fluid 1201 may be introduced to a sensor 1205 which responds with a sensor output signal, for example, voltage signal $V_i$ indicative of the flow of process fluid 1201 through the sensor. Sensor 1205 may be, for example, coupled to an MFC controlling the introduction of a process fluid into a process chamber during fabrication of a semiconductor device.

In step 1200, the sensor output signal $V_i$ may be preprocessed to place it in a desired format. For example, sensor output signal $V_i$ may be converted into a digital signal and/or normalized, such that the signal represents a fraction of full scale flow through the sensor to provide preprocessed signal $S_i$.

In step 1210, the preprocessed sensor output signal $S_i$ is converted to a characteristic value $C_i$ according to a sensor model being employed. It should be appreciated that the sensor model employed to map sensor output values of the test fluid during calibration to characteristic values should also be employed to map sensor output values of the process fluid to characteristic values.

Alternately, as described above, calibration may include recording only response information from the test fluid. Under such circumstances, a same mapping from flow rates to $\Phi$ values and from sensor output values to characteristic values according to a desired sensor model may be employed to both map the recorded test response information to characteristic information, and to map sensor output values $S_i$ to characteristic values during operation of the sensor.

For example, $S_i$ may be multiplied by a fluid dependent scale factor $f_p$ and divided by the thermal conductivity $\kappa_p$ of the process fluid to provide characteristic value $C_i$ similar to the step 1110 of the calibration described in connection with FIG. 11. Sensor output values resulting from flow of the process fluid are thus mapped to values substantially along the characteristic curve of the sensor model.

Since the sensor model establishes that sensor output values map to the same characteristic curve, the value $C_i$ is expected to fall somewhere along the curve described by the representation of the characteristic function obtained during calibration, for example, look-up table 1235 (e.g., a look-up table obtained as described in connection with FIG. 11). Accordingly, it may then be determined where on the curve $C_i$ falls, by indexing look-up table 1235 to obtain the associated operand $\Phi_i$.

Due to the discrete nature of a look-up table, a computed characteristic value $C_i$ is likely to fall between values stored in the LUT. Accordingly, a given characteristic value may not have a directly associated operand $\Phi_i$. However, the operand $\Phi_i$ may be approximated by interpolating between the two nearest values stored in the LUT, for example, by a piecewise linear approximation, such that a corresponding value $\Phi_i$ may be obtained.

In step 1230, a flow rate predicting the actual flow of the process fluid through the sensor is computed from the obtained value $\Phi_i$. As discussed in the foregoing, the value $\Phi_i$ is a function of flow rate and known sensor and fluid properties such that the flow rate component of a particular value of $\Phi$ may be isolated from $\Phi_i$. For example, the value $\Phi_i$ may be multiplied by a ratio between the thermal conductivity and specific heat of the process fluid, and a scaled ratio of the cross sectional area of the flow path A and the characteristic length L of the sensor conduit. This operation isolates the mass flow rate component from the obtained value of the $\Phi$ operand providing flow rate $F_i$ as an accurate determination of the actual flow rate through the sensor.

It should be appreciated that the same look-up table may be used regardless of the process fluid with which the sensor is operating. That is, a single representation of the characteristic function of a sensor obtained, for example, from calibration or during operation from response information of any one test fluid may be sufficient to describe the behavior of the sensor, such that accurate flow rates may be determined for any arbitrary process fluid. In addition, sensor models according to the present invention also describe the behavior of the sensor across an extended range of flow rates. As such, flow rates of an arbitrary fluid may be accurately predicted well outside the linear range of the fluid. Accordingly, the sensor may be employed effectively in a broad range of applications.

Tables 5-10 demonstrate actual experimental data using methods according to the present invention in comparison with conventional techniques. In particular, Tables 5, 7 and 9 illustrate determination of flow rates resulting from operating with argon (Ar), CF4 and SF6 using the look-up table tabulated during a calibration of the sensor with nitrogen as shown in Tables 3 and 4.

In Table 5, the sensor calibrated on N2 is operated with the process fluid argon. The first column lists a number of sensor output values provided by the sensor in response to flow of argon through the sensor at unknown flow rates. The second column illustrates the sensor output values mapped to characteristic values based on the thermal conductivity of argon and a scale factor f determined empirically for argon at 0.98. The third column illustrates the corresponding value of $\Phi$ obtained from the LUT table as shown in Table 4. The fourth column illustrates the determined flow rate computed from the obtained value of $\Phi$. The fifth column lists actual flow rates as measured by, for example, a volumetric displacement flow meter. The sixth and final column illustrates the percent error obtained by using the described method. Tables 7 and 9 are arranged in the same way for process fluids CF4 and SF6, respectively.

For contrast, Table 6 illustrates flow rates determined using conventional conversion factors. The first column lists the sensor output values as shown in column one of Table 5. The second column lists the flow rates measured during calibration with nitrogen (i.e., column two of Tables 3 and 4). The third column lists the predicted flow rates computed using a conventional conversion factor. The conversion factor used for argon is 1.428. The fourth column lists the actual measured flow rates, and the fifth column shows the percentage error obtained using conventional conversion techniques. Tables 8 and 10 are arranged in the same way listing results from conventional operation with process fluids CF4 and SF6, respectively.

TABLE 5

Test Fluid Nitrogen/Process Fluid Argon
f = .98, g = .985

| Sensor Output | f * S/k | $\Phi$ = RePr | Computed Flow Rate (sccm) | Actual Flow Rate (sccm) | Percent Error |
|---|---|---|---|---|---|
| 0.0 | 0.000 | 0.000 | 0.000 | 0.000 | 0.0% |
| 0.1 | 8.294 | 308.629 | 2.584 | 2.603 | 0.71% |
| 0.2 | 16.588 | 619.770 | 5.190 | 5.234 | 0.84% |
| 0.3 | 24.882 | 932.778 | 7.811 | 7.894 | 1.05% |
| 0.4 | 33.176 | 1252.886 | 10.491 | 10.609 | 1.11% |
| 0.5 | 41.471 | 1588.059 | 13.298 | 13.416 | 0.88% |
| 0.6 | 49.765 | 1949.001 | 16.320 | 16.391 | 0.43% |
| 0.7 | 58.059 | 2335.807 | 19.559 | 19.623 | 0.33% |
| 0.8 | 66.353 | 2793.436 | 23.391 | 23.343 | −0.20% |
| 0.9 | 74.647 | 3345.346 | 28.012 | 27.600 | −1.49% |

TABLE 6

Surrogate Fluid Nitrogen/Process Fluid Argon
Conversion Factor: 1.428

| Sensor Output | Calibrated N2 Flow Rate (sccm) | Computed Flow Rate Conventional Method | Actual Flow | Percent Error |
|---|---|---|---|---|
| 0.000 | 0.000 | 0.000 | 0.000 | |
| 0.100 | 1.842 | 2.630 | 2.603 | |
| 0.200 | 3.709 | 5.296 | 5.234 | −1.20% |
| 0.300 | 5.571 | 7.956 | 7.894 | −0.78% |
| 0.400 | 7.443 | 10.629 | 10.609 | −0.19% |
| 0.500 | 9.339 | 13.335 | 13.416 | 0.60% |
| 0.600 | 11.281 | 16.109 | 16.391 | 1.72% |
| 0.700 | 13.297 | 18.988 | 19.623 | 3.24% |

TABLE 6-continued

Surrogate Fluid Nitrogen/Process Fluid Argon
Conversion Factor: 1.428

| Sensor Output | Calibrated N2 Flow Rate (sccm) | Computed Flow Rate Conventional Method | Actual Flow | Percent Error |
|---|---|---|---|---|
| 0.800 | 15.412 | 22.008 | 23.343 | 5.72% |
| 0.900 | 17.653 | 25.209 | 27.600 | 8.66% |

TABLE 7

Test Fluid Nitrogen/Process Fluid CF4
f = 1.012, g = 1.013

| Sensor Output | f * S/k | Φ = RePr | Computed Flow Rate (sccm) | Actual Flow Rate (sccm) | Percent Error |
|---|---|---|---|---|---|
| 0.0 | 0.000 | 0.000 | 0.000 | 0.000 | |
| 0.1 | 8.092 | 292.723 | 0.800 | 0.771 | |
| 0.2 | 16.184 | 587.925 | 1.607 | 1.578 | |
| 0.3 | 24.277 | 884.535 | 2.418 | 2.394 | −0.98% |
| 0.4 | 32.369 | 1187.568 | 3.246 | 3.225 | −0.67% |
| 0.5 | 40.461 | 1503.049 | 4.109 | 4.089 | −0.47% |
| 0.6 | 48.553 | 1841.992 | 5.035 | 5.010 | −0.49% |
| 0.7 | 56.645 | 2206.149 | 6.030 | 6.025 | −0.09% |
| 0.8 | 64.738 | 2622.363 | 7.168 | 7.217 | 0.68% |
| 0.9 | 72.830 | 3126.168 | 8.545 | 8.624 | 0.91% |
| 1.0 | 80.922 | 3815.034 | 10.428 | 10.497 | 0.65% |

TABLE 8

Surrogate Fluid Nitrogen/Process Fluid CF4
Conversion Factor: .437

| Sensor Output | Calibrated N2 Flow Rate (sccm) | Computed Flow Rate Conventional Method | Actual Flow | Percent Error |
|---|---|---|---|---|
| 0.000 | 0.000 | 0.000 | 0.000 | |
| 0.100 | 1.842 | 0.805 | 0.771 | |
| 0.200 | 3.709 | 1.621 | 1.578 | |
| 0.300 | 5.571 | 2.435 | 2.394 | −1.67% |
| 0.400 | 7.443 | 3.253 | 3.225 | −0.87% |
| 0.500 | 9.339 | 4.081 | 4.089 | 0.21% |
| 0.600 | 11.281 | 4.930 | 5.010 | 1.61% |
| 0.700 | 13.297 | 5.811 | 6.025 | 3.56% |
| 0.800 | 15.412 | 6.735 | 7.217 | 6.69% |
| 0.900 | 17.653 | 7.715 | 8.624 | 10.55% |
| 1.000 | 20.007 | 8.743 | 10.497 | 16.71% |

TABLE 9

Test Fluid Nitrogen/Process Fluid SF6
f = 1.0, g = 1.0

| Sensor Output | f * S/k | Φ = RePr | Computed Flow Rate (sccm) | Actual Flow Rate (sccm) | Percent Error |
|---|---|---|---|---|---|
| 0.0 | 0.000 | 0.000 | 0.000 | | |
| 0.1 | 9.306 | 341.462 | 0.498 | | |
| 0.2 | 18.613 | 685.428 | 1.001 | | |
| 0.3 | 27.919 | 1032.870 | 1.508 | | |
| 0.4 | 37.226 | 1393.283 | 2.034 | 2.018 | −0.78% |
| 0.5 | 46.532 | 1776.372 | 2.593 | 2.586 | −0.28% |
| 0.6 | 55.839 | 2197.182 | 3.207 | 3.210 | 0.09% |
| 0.7 | 65.145 | 2680.433 | 3.913 | 3.936 | 0.60% |
| 0.8 | 74.451 | 3281.356 | 4.790 | 4.833 | 0.89% |

TABLE 10

Surrogate Fluid Nitrogen/Process Fluid SF6
Conversion Factor: .437

| Sensor Output | Calibrated N2 Flow Rate (sccm) | Computed Flow Rate Conventional Method | Actual Flow | Percent Error |
|---|---|---|---|---|
| 0.000 | 0.000 | 0.000 | | |
| 0.100 | 1.842 | 0.510 | | |
| 0.200 | 3.709 | 1.027 | | |
| 0.300 | 5.571 | 1.543 | | |
| 0.400 | 7.443 | 2.062 | 2.018 | −2.17% |
| 0.500 | 9.339 | 2.587 | 2.586 | −0.03% |
| 0.600 | 11.281 | 3.125 | 3.210 | 2.66% |
| 0.700 | 13.297 | 3.683 | 3.936 | 6.43% |
| 0.800 | 15.412 | 4.269 | 4.833 | 11.67% |

As shown, methods according to the present invention provide accurate flow rate predictions across a wide range of flow rates. By contrast, conventional conversion techniques provide accurate results only within a limited range of flow values. In particular, as shown in Tables 6, 8 and 10, flow rates errors become unsatisfactorily high outside the linear range of the sensor response curve for the particular fluid.

Figure 13:
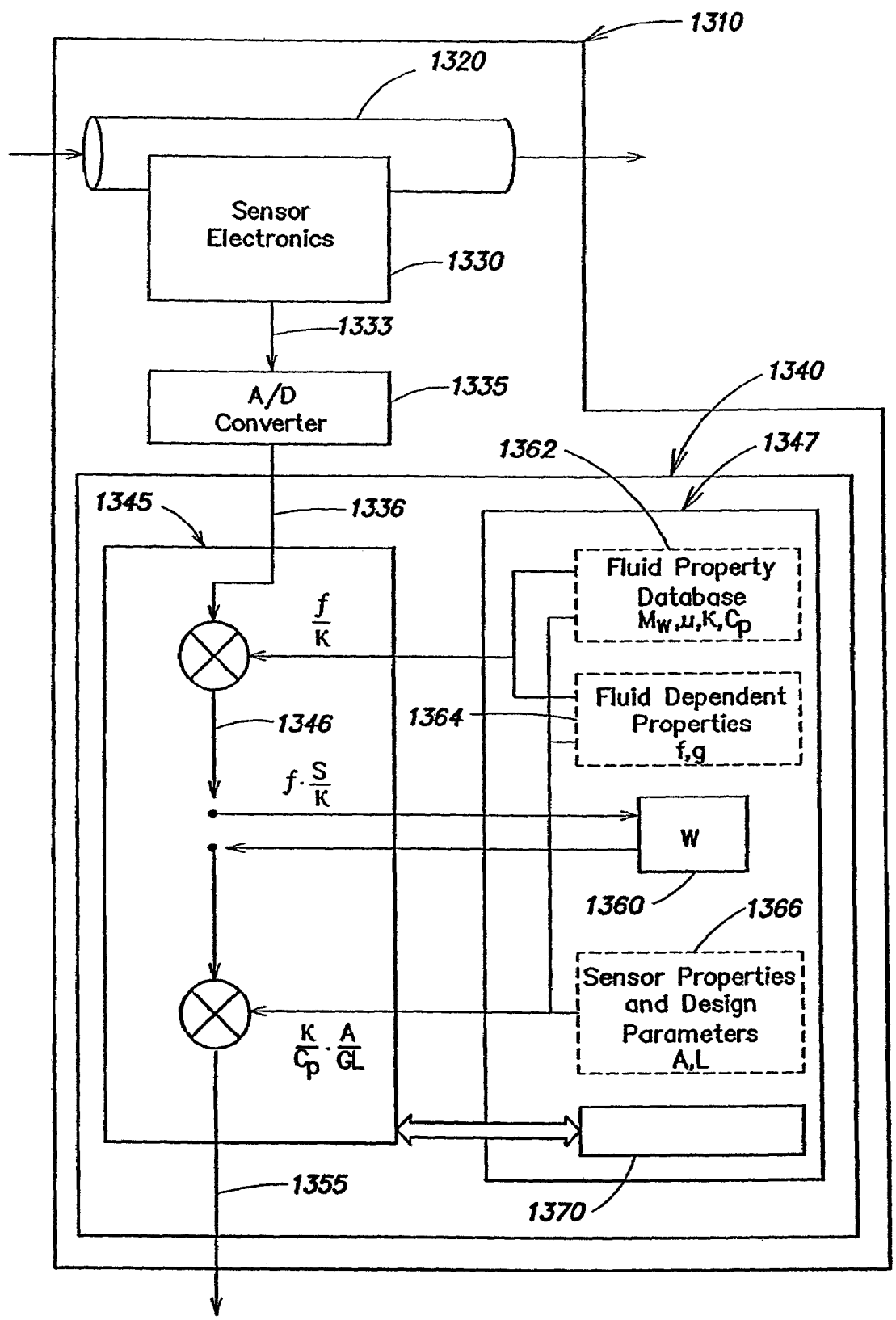
FIG. 13 illustrates one embodiment of a flow sensor incorporating various aspects of the present invention.

Applicant has appreciated that various aspects of the present invention may be used to provide a general purpose sensor capable of operating accurately on arbitrary process fluids across a wide range of flow rates. FIG. 13 illustrates one embodiment of a sensor according to the present invention. Sensor 1310 includes a conduit 1320, sensor electronics 1330, analog-to-digital (A/D) converter 1335 and computer 1340 having a processor 1345 and a storage medium 1347. Sensor electronics are coupled to the conduit 1320 and respond to flow in the conduit by providing a sensor output signal 1333 indicative of the fluid flow through the conduit. Sensor electronics 1330 may be any circuit or combination of circuits responsive to fluid flow, for example, the thermal mass flow sensor described in connection with FIG. 1. It should be appreciated that various aspects of the invention may be employed in a variety of sensors such as those described in previously incorporated applications, and is not limited to any particular sensor configuration.

Sensor output signal 1333 may be, for instance, an electronic analog signal such as a voltage or current level. A/D converter 1335 receives sensor output signal 1333 and converts it to a digital signal 1336 that is provided to processor 1345 of computer 1340. Processor 1345 may be any device or combination of devices capable of arithmetic and/or logic computation. Processor 1345 may preprocess the digital signal 1336, for instance, to normalize the signal, such that it is expressed as a fraction of the full scale flow through conduit 1320.

Processor 1345 may be implemented in a number of ways including using dedicated hardware (e.g., various circuitry, programmable logic arrays, etc.) designed and/or configured to perform any one of a variety of functions described herein, and/or using one or more computers or processors (e.g., microprocessors) that are programmed using microcode (i.e., software) to perform any one or more of the variety of functions described herein.

Processor 1345 may be coupled to storage medium 1347. Storage medium 1347 may store various sensor and fluid information that facilitates operating the sensor with any number of process fluids. For example, storage medium 1347 may be encoded with physical and/or thermal properties of various fluids for which the sensor is intended to accurately measure flow, fluid dependent properties of the fluid, physical properties and/or design parameters of the sensor, etc. Storage medium 1347 may be any of various storage devices and computer readable media, and can be implemented in numerous ways, such as, but not limited to, RAM, ROM, PROM, EPROM, EEPROM, CD, DVD, optical disks, floppy disks, magnetic tape, and the like.

In the embodiment illustrated in FIG. 13, storage medium 1347 stores a representation 1360 of the characteristic function W of sensor 1310. In addition, storage medium 1347 stores properties of various fluids 1362, including thermal conductivity, viscosity, and specific heat, and fluid dependent properties 1364 for each of a set of process fluids. Storage medium 1347 may also store sensor properties 1366, including the cross-sectional area and the characteristic length of conduit 1320.

Processor 1345 may convert digital signal 1336 into flow signal 1355 based on data stored on storage medium 1347. In particular, processor 1345 may convert digital signal 1336 to flow signal 1355 according to the representation of characteristic finction 1360 and properties of the sensor and process fluid fΦ or which operation of the sensor is desired. For example, storage medium 1347 may be encoded with instructions in the form of one or more programs (e.g., program 1370) that, when executed by processor 1345 performs one more conversion methods according to the present invention, for instance, the methods described in connection with FIGS. 7 and 11.

In particular, program 1370 may include instructions that when executed by processor 1345 multiply digital signal 1336 by a ratio of the thermal conductivity of the process fluid flowing through the conduit and a scale factor for the process fluid to provide signal 1346. Program 1370 may further include instruction programmed to use signal 1346 to index into the representation 1360 of the characteristic function W stored in storage medium 1347 to obtain an associated value of Φ according to instructions in program 1370. Further instructions included in program 1370 when executed by processor 1345 may multiply the obtained value of Φ by properties of the sensor and the process fluid to provide flow signal 1355. Flow signal 1355 may then be provided to other devices, components and/or control circuits as an accurate indication of the actual fluid flowing through the sensor conduit.

It should be appreciated that computer 1340 may be resident on sensor 1310, for example, as an embedded microcontroller. Alternatively, computer 1340 may be part of a device operating in conjunction with sensor 1310. For example, computer 1340 may be part of a mass flow controller or mass flow meter that includes sensor 1310 as a component part or may be a part of a separate controller located proximate to or remote from the sensor 1320. As discussed briefly in the foregoing, mass flow controllers often include a processor and a memory or may be coupled to, for example, a general purpose computer having a processor and memory which may be used to implement the present invention and which may be employed to control the flow of fluids.

Conventional mass flow controllers generally include four main portions: a flow meter, a control valve, a valve actuator, and a controller. The flow meter measures the mass flow rate of a fluid in a flow path and provides a signal indicative of that flow rate. The flow meter may include a mass flow sensor and a bypass. The mass flow sensor measures the mass flow rate of fluid in a sensor conduit that is fluidly coupled to the bypass. The mass flow rate of fluid in the sensor conduit is approximately proportional to the mass flow rate of fluid flowing in the bypass, with the sum of the two being the total flow rate through the flow path controlled by the mass flow controller. However, it should be appreciated that some mass flow controllers may not employ a bypass, as such, all of the fluid may flow through the sensor conduit.

In many mass flow controllers, a thermal mass flow sensor is used that includes a pair of resistors that are wound about the sensor conduit at spaced apart positions, each having a resistance that varies with temperature similar to that described in connection with FIG. 1. A control valve may be positioned in the main fluid flow path (typically downstream of the bypass and mass flow sensor) and can be controlled (e.g., opened or closed) to vary the mass flow rate of fluid flowing through the main fluid flow path and provided by the mass flow controller. The valve is typically controlled by a valve actuator, examples of which include solenoid actuators, piezoelectric actuators, stepper actuators, etc. Some mass flow controllers may not include a valve or valve actuator and function, rather, as general purpose mass flow meters.

Control electronics control the position of the control valve based upon a set point indicative of the mass flow rate of fluid that is desired to be provided by the mass flow controller, and a flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. In each of the aforementioned feedback control methods, a control signal (e.g., a control valve drive signal) is generated based upon an error signal based on the difference between a set point signal indicative of the desired mass flow rate of the fluid and a feedback signal that is related to the actual mass flow rate sensed by the mass flow sensor. One example of a mass flow controller is described in U.S. patent application Ser. No. 10/131,603, which is hereby incorporated by reference in its entirety.

Figure 14:
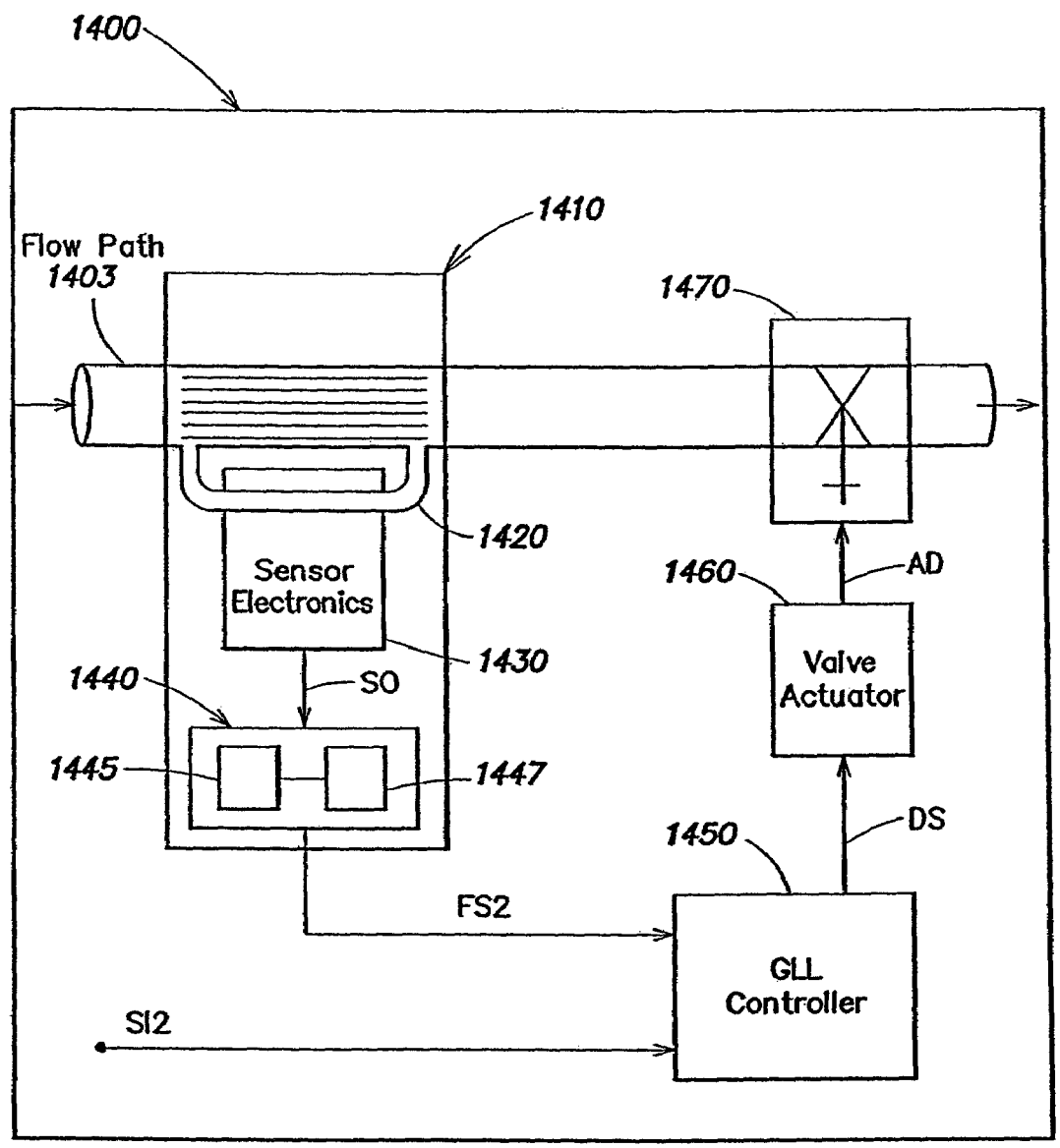
FIG. 14 illustrates one embodiment of a mass flow controller including a flow sensor operating according to various aspects of the present invention.

FIG. 14 illustrates a schematic block diagram of a mass flow controller according to one embodiment of the present invention. The mass flow controller illustrated in FIG. 14 includes a flow meter 1410, a controller 1450, a valve actuator 1460, and a valve 1470. The flow meter 1410 is coupled to a flow path 1403. The flow meter 1410 senses the flow rate of a fluid in the flow path, or portion of the flow path, (e.g., sensor conduit 1420) and provides a flow signal FS2 indicative of the sensed flow rate. The flow signal FS2 is provided to a first input of a Gain Lead-Lag (GLL) controller 1450.

Controller 1450 also includes a second input to receive a set point signal SI2. A set point refers to an indication of the desired fluid flow to be provided by the mass flow controller 1400. Any of a variety of signals capable of providing indication of the desired fluid flow is considered a suitable set point signal. The term set point, without reference to a particular signal, describes a value that represents a desired fluid flow.

Based in part on the flow signal FS2 and the set point signal SI2, the GLL controller 1450 provides a drive signal DS to the valve actuator 1460 that controls the valve 1470. The valve 1470 may be positioned downstream from the flow meter 1410, although the present invention is not limited to such an implementation, as the valve may be alternatively disposed upstream of the flow meter. The valve permits a certain mass flow rate depending, at least in part, upon the displacement of a controlled portion of the valve. The controlled portion of the valve may be, for example, a moveable plunger placed across a cross-section of the flow path. The valve controls the flow rate in the fluid path by increasing or decreasing the area of an opening in the cross section where fluid is permitted to flow. Typically, mass flow rate is controlled by mechanically displacing the controlled portion of the valve by a desired amount. The term displacement is used generally to describe the variable of a valve on which mass flow rate is, at least in part, dependent.

The displacement of the valve is often controlled by a valve actuator, such as a solenoid actuator, a piezoelectric actuator, a stepper actuator, etc. In FIG. 14, valve actuator 1460 may be a solenoid type actuator, however, the present invention is not so limited, as other alternative types of valve actuators may be used. The valve actuator 1460 receives drive signal DS from the controller and converts the signal DS into a mechanical displacement of the controlled portion of the valve.

Controller 1450 displaces valve 1470 in such a way as to reduce the error between the actual fluid flow as indicated by flow signal FS2 and the desired flow as indicated by SI2. Stated differently, controller 1450 attempts to bring the actual flow and the desired flow into agreement based upon measurements made by the flow meter 1410. Accordingly, the precision with which the mass flow controller operates depends on how accurately flow signal FS2 approximates the actual flow through flow path 1403.

As discussed in the foregoing, the accuracy of conventional flow sensors may depend on the type of fluid flowing through flow path, the desired flow rate, and the similarity between a process fluid introduced to the sensor and the available surrogate fluids. Furthermore, when flow through the flow path is outside the linear range of a sensor response curve for a particular process fluid, the accuracy of the flow signal may suffer to the extent that it cannot be used for certain applications and/or adversely effect the process for which it is employed. For example, when the accuracy of the flow signal is outside the tolerances of a semiconductor fabrication process, the mass flow controller may be unsatisfactory to control the process or may have adverse effects on the fabrication yield of, for instance, integrated circuits, computer chips, etc.

As such, in one embodiment according to the present invention, MFC 1400 includes a computer 1440 having a processor 1445 and a memory 1447. Computer 1440 may be similar to that described in connection with FIG. 13. In particular, memory 1447 may be encoded with a representation of the characteristic function of the sensor and, for example, a database of sensor and fluid properties. Accordingly, computer 1440 may be adapted to convert sensor output signal SO to flow signal FS2 based on information included in the representation of the characteristic function.

For example, computer 1440 may include a program stored in memory 1447 that when executed by processor 1445 performs conversion methods according to the present invention, for instance, the methods described in connection with FIGS. 7 and 11. Accordingly, accurate flow indications may be obtained for arbitrary process fluids across an extended range of flow rates substantially beyond the linear range of the particular process fluid directly from sensor output values resulting from flow of an arbitrary fluid.

It should be appreciated that the computer 1440 need not be a separate processor distinct from the controller 1450, but may correspond to a program that is implemented by the controller 1450 or vice versa. Moreover, computer 1440 and controller 1450 need not be integral with or proximate to other components of the MFC but may be located remotely.

Figure 15:
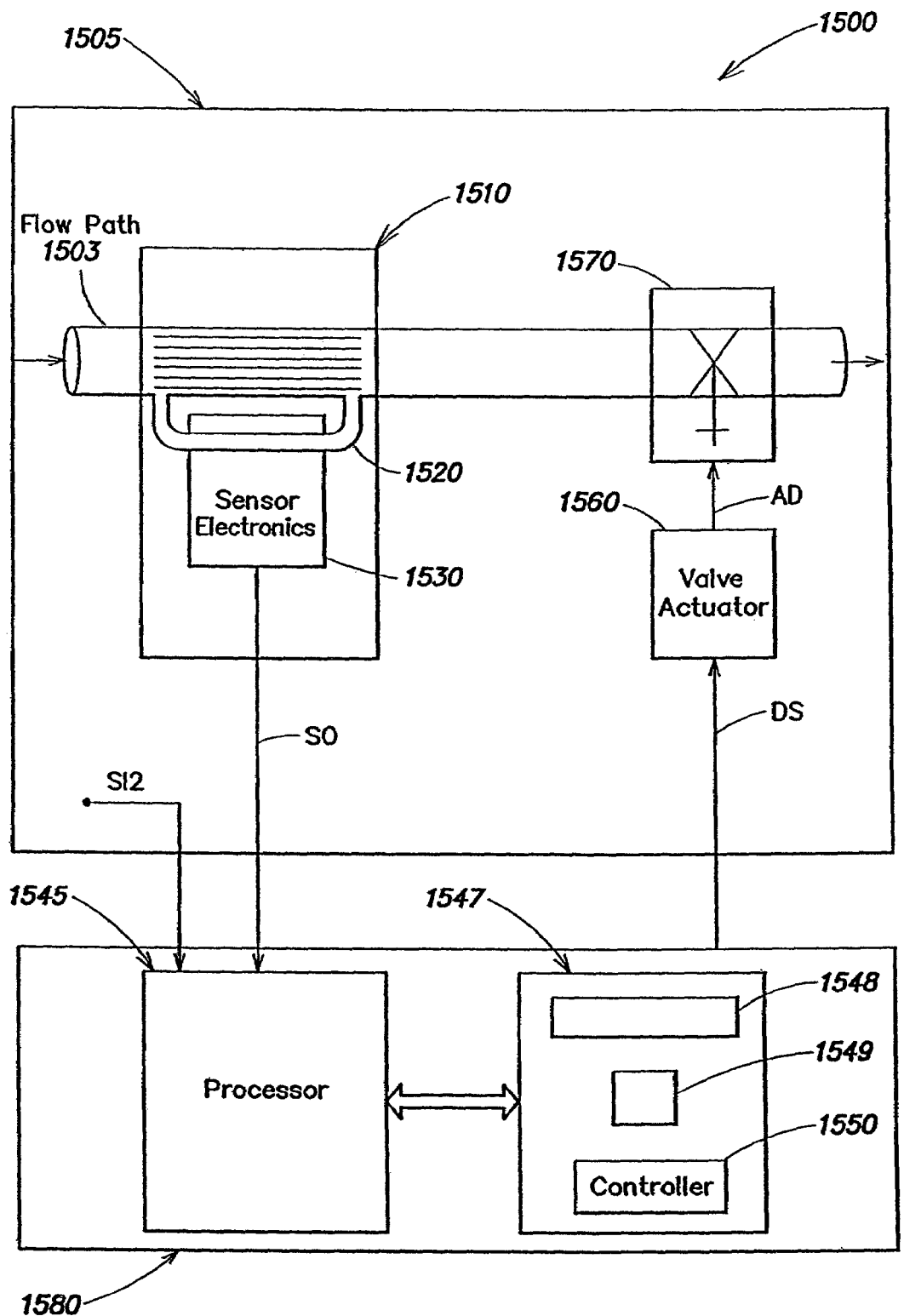
FIG. 15 illustrates another embodiment of a mass flow controller including a flow sensor wherein the controller and various methods of processing a sensor output signal are implemented on a separate computer located proximate to or remote from the sensor of the mass flow controller.

FIG. 15 illustrates a schematic block diagram of a mass flow controller 1500 having a remote computer 1580. Portion 1505 of MFC 1500 generally includes the components that are coupled to the flow path 1503 of the MFC, for example, a flow meter 1510, a valve actuator 1560, and a valve 1570 coupled to flow path 1503. The flow meter 1510 may be any suitable device for providing a sensor output signal (e.g. sensor output SO) indicative of the flow rate of fluid through the flow path 1503. The sensor output SO may be provided to a first input of a remote computer 1580.

Remote computer 1580 may be any processor based device or combination of devices, for example, any of various general-purpose computers such as those based on a Intel PENTIUM-type processor, a Motorola PowerPC processor, Sun UltraSPARC processor, Hewlett-Packard PA-RISC processors, or any other type of processor.

For example, remote computer 1580 may include a processor 1545 and a memory 1547. Memory 1547 may be encoded with similar information as the memory described in connection with FIG. 13. In particular, memory 1547 may include a representation 1549 of the characteristic function of the sensor and, for example, a database of sensor and fluid properties. Memory 1547 may also include one or more programs 1548 including instructions that, when executed on processor 1545, may determine flow rates of an arbitrary process fluid from sensor output signal SO based on information included in the representation of the characteristic function.

In addition, memory 1547 may include one or more programs depicted schematically in memory as controller 1550 that, when executed on processor 1545, determines a drive signal based on flow rates determined by program 1548 and a set point signal S12 provided as a second input to remote computer 1580. In particular, controller 1550 may include instructions that apply various feedback control methods such as proportional control, integral control, PI control, derivative control, PD control, ID control, PID control, GLL control, etc., that attempt to reduce the difference between the flow rate provided by program 1548 and the set point signal S12 by providing a drive signal DS to the valve actuator 1560 that controls valve 1570.

Figure 16:
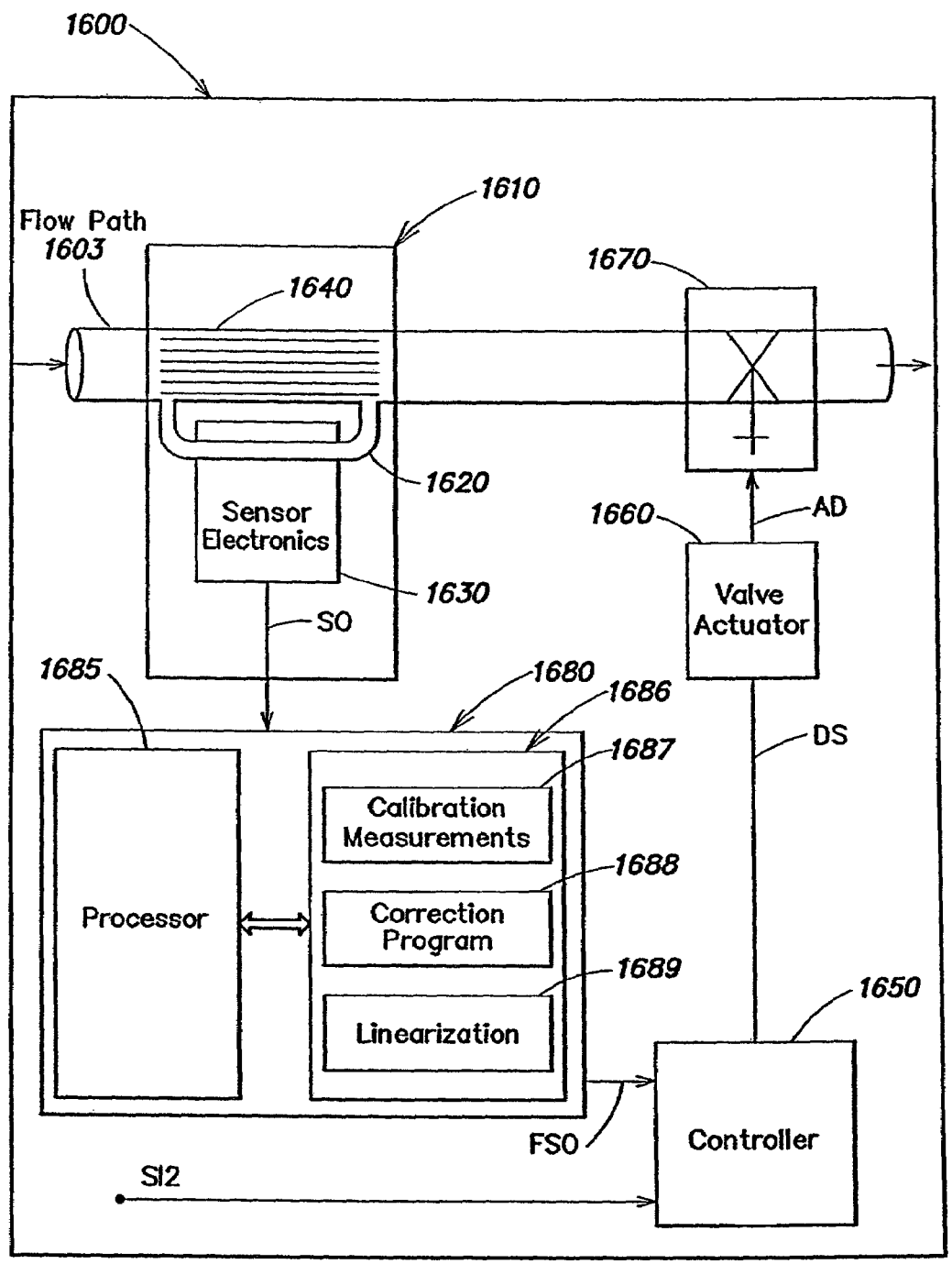
FIG. 16 illustrates another embodiment of a mass flow controller including a flow sensor having a sensor conduit and a bypass wherein a linearization curve for an arbitrary fluid may be determined by separately correcting sensor flow and bypass flow by employing a sensor model according to the present invention.

In many devices that employ flow sensors, a flow path adapted to convey fluids is comprised of a sensor conduit and a bypass. FIG. 16 illustrates a schematic block diagram of an MFC 1600 including a flow sensor 1610 having sensor electronics 1630 (i.e., circuitry responsive to fluid flow) coupled to conduit 1620 which diverts some portion of the fluid flowing through the flow path 1603. The remainder and often majority of the fluid flowing through flow path 1603 flows through bypass 1640. The bypass 1640 may be formed in any manner, for example, from a plurality of tubes or conduits similar in nature to the sensor conduit packaged together to form a path by which fluid may bypass the sensor conduit. The amount of fluid flowing through the conduit 1620 is generally proportional to the amount of fluid flowing in the bypass 1640.

However, across the range of flow rates that may be introduced to the flow path 1603, the relationship between the flow rate in the conduit 1620 and the flow rate in the bypass 1640 may not be linear. That is, the ratio between fluid flowing through the sensor conduit, referred to as sensor flow, and fluid flowing through the bypass, referred to as bypass flow, is not constant for all flow rates.

Flow rates in flow path 1603 may vary between zero flow and some full scale flow value. Often one or more flow signals provided by the sensor (e.g., sensor output SO) will be normalized such that they indicate a fraction of the full scale flow value. For example, SO may be normalized by full scale flow such that, ideally, a value of 0.0 indicates that there is no fluid flowing through the fluid path, a value of 0.3 indicates a flow of 30% of full scale flow, a value of 0.5 indicates a flow of 50% of full scale flow, etc. However, in practice, this linear relationship may not result for the following two different reasons: 1) SO may not be linear with respect to sensor flow; and 2) the ratio of sensor flow to bypass flow may not be constant across a desired range of flow rates.

In conventional flow sensors, a linearization curve is often generated that maps sensor output values (e.g., sensor output signal SO) to indicated flow values having a substantially more linear relationship with respect to the total flow through the flow path than the sensor output values. The term "indicated flow" refers to any signal or indication of flow based on a sensor output signal that has been corrected and/or adjusted to compensate for error and/or nonlinearity in the sensor (i.e., the sensor conduit and sensor electronics, the bypass or both).

The term "total flow" refers generally to the complete flow rate of fluid through the flow path. As such, when the flow path consists of a sensor conduit the total flow is equal to the sensor flow. When the flow path comprises a sensor conduit and a bypass, the total flow is equal to the sum of the sensor flow and the bypass flow.

During a conventional calibration procedure, one or more surrogate fluids may be introduced to the flow path at a variety of flow rates. The sensor may respond with a sensor output signal, values of which are recorded along with the associated total flow rate through the sensor. The recorded values may indicate the relationship between total flow and sensor output for a particular surrogate fluid. Since the desired relationship between total flow and sensor output may be linear, a linearization curve may be generated that maps each sensor output value to an indicated flow value that has a substantially more linear relationship with total flow.

However, the relationship between total flow and sensor output will change from fluid to fluid such that a linearization curve for a particular surrogate fluid may not be valid for an arbitrary process fluid. To compensate, conventional methods have generated multiple linearization curves for a number of surrogate fluids. During operation on a process fluid, the linearization curve generated for the most similar surrogate fluid is then used and a constant conversion factor is applied. However, such constant conversion factors are largely empirical and highly inaccurate outside the linear range of the fluid. In addition to inaccuracies, obtaining calibration measurements for use in generating linearization curves for numerous surrogate fluids is a time consuming process.

Applicant has appreciated that conventional conversion factors may be deficient in part because the relationship between total flow and sensor output varies from fluid to fluid according to multiple influences. As noted by Applicant, this relationship may have components including the nonlinearity between sensor flow and sensor output and between sensor flow and bypass flow. These two components may vary differently from fluid to fluid and are often insufficiently compensated or corrected for by conventional conversion factors.

In particular, a change from a first fluid to a second fluid may cause the relationship between sensor flow and sensor output to change in a different manner than the relationship between total flow and sensor flow. For example, respective components may be effected by different properties of the fluid or operating conditions of the sensor. As such, conventional conversion factors which are largely empirical do not address the independent variation of the different component influences on the sensor and are therefore often inadequate.

Applicant has identified and appreciated that by employing a sensor model according to the present invention, the relationship between sensor output and sensor flow can be characterized and accurately described from fluid to fluid. An accurate description of this relationship facilitates decoupling the effects due to the non-linearity between sensor flow and sensor output and sensor flow and bypass flow such that each can be independently corrected for when operating on an arbitrary process fluid.

Accordingly, one aspect of the invention includes obtaining calibration measurements with a test fluid that facilitate separating flow meter behavior into component parts such that the behavior of each component can be addressed and/or independently corrected when the sensor is operating on an arbitrary process fluid.

Figure 17:
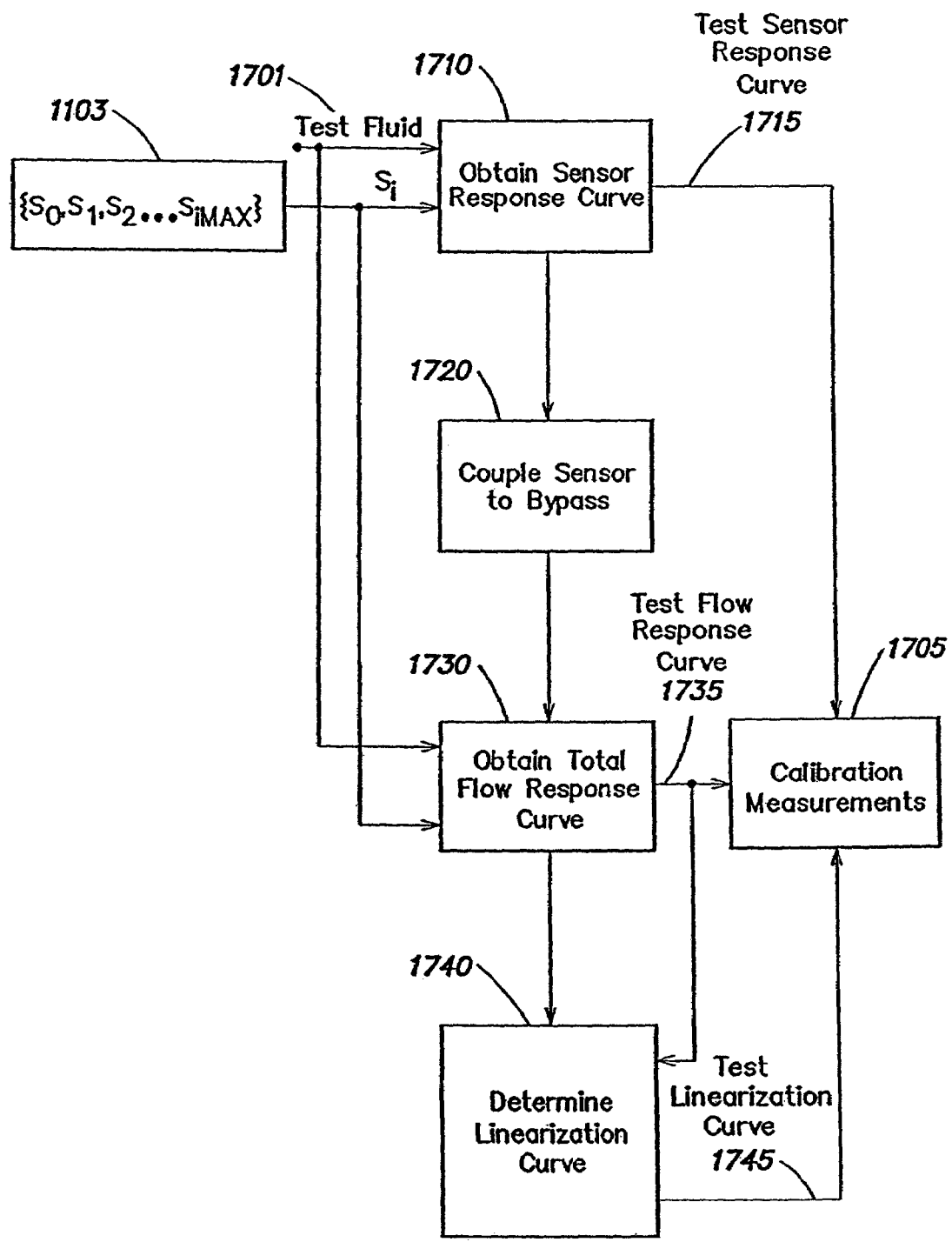
FIG. 17 illustrates one method of obtaining calibration measurements of a test fluid that facilitates determining a linearization curve for an arbitrary fluid according to another aspect of the present invention.

FIG. 17 illustrates one embodiment of the present invention including calibrating a sensor on a test fluid to obtain calibration measurements that facilitate correcting separately sensor non-linearity and bypass non-linearity by employing a sensor model when operating the sensor on an arbitrary process fluid.

In step 1710, a test fluid 1701, for example nitrogen, having known thermal/physical properties is introduced to a sensor before it has been coupled to a bypass. That is, the flow path consists of the sensor conduit. The test fluid 1701 is introduced to the sensor conduit at various flow rates such that the sensor responds with a set S of desired sensor output values using calibration equipment as described in the foregoing. The flow rates giving rise to the desired sensor output values are measured by, for example, a volumetric flow meter, and recorded such that the relationship between sensor flow and sensor output is obtained. This sensor response information may then be stored as part of calibration measurements 1705.

In step 1720, the sensor may be coupled to a bypass such that the flow path of the sensor includes both the sensor conduit and the bypass. Similar to step 1710, test fluid 1701 may be introduced to the sensor flow path to provide the various desired sensor output values in set S and the corresponding flow rates are recorded such that the relationship between total flow and sensor output is obtained. This total response information may be further stored as part of calibration measurements 1705.

In step 1730, a linearization curve may be generated that, when applied to the sensor output values resulting from flow of the test fluid, maps sensor output values to indicated flow values having a substantially linear relationship with total flow. This linearization curve may also be stored as part of calibration measurements 1705.

For example, a curve may be fit to the set of points indicating total flow rate as a function of sensor output by a piecewise linear approximation of the set of points. A linearization curve may then be determined that maps values along the total flow curve to values along a straight line such that the relationship between sensor output and total flow is linear for the test fluid. For example, a linearization curve may be generated by performing a least squares fit of the total flow curve to a line connecting the sensor output value at zero flow and the sensor output values at full scale flow. Various methods of generating a linearization curve or linearization information will occur to those skilled in the art. However, any method of mapping a total flow curve substantially to a line is considered to be within the scope of the invention.

The various calibration measurements obtained as described in the foregoing may be stored, for example, as calibration measurements 1687 in the memory of computer 1680 of FIG. 16, and subsequently used to facilitate an independent correction of sensor and bypass response to operating with an arbitrary process fluid.

It should be appreciated that the set of points indicating the relationship between sensor flow and sensor output is a sensor response curve (e.g., the set of points obtained in step 1710 and stored in calibration measurements 1705). As such, in conjunction with a sensor model according to the present invention, a sensor response curve obtained with a test fluid includes characteristic information about the sensor. That is, a representation of the characteristic function may be obtained by applying the sensor model to the sensor response curve of the test fluid. This representation of the characteristic function may facilitate computing a sensor response curve for an arbitrary process fluid. By determining a process sensor response curve, the sensor behavior can be corrected for independently of the bypass behavior.

Referring again to FIG. 16, sensor 1610 may be coupled to computer 1680 having a processor 1685 and memory 1686. Memory 1686 may store various calibration measurements 1687 obtained using a test fluid during calibration of the sensor as described above in connection with FIG. 17. In particular, memory 1686 may include a sensor response curve of the test fluid, a total flow response curve of the test fluid and a linearization curve corresponding to the total flow response curve. In addition, memory 1686 may include at least one program containing instructions that, when executed by processor 1685, maps sensor output values to characteristic values and corresponding flow rates to operand values of the characteristic function of the sensor. In addition, one or more programs stored in memory 1686 may include instructions configured to access a representation of a characteristic function to obtain an associated operand value and to compute a flow rate from the obtained operand value as discussed in connection with the various embodiments described in the foregoing.

Figure 18A:
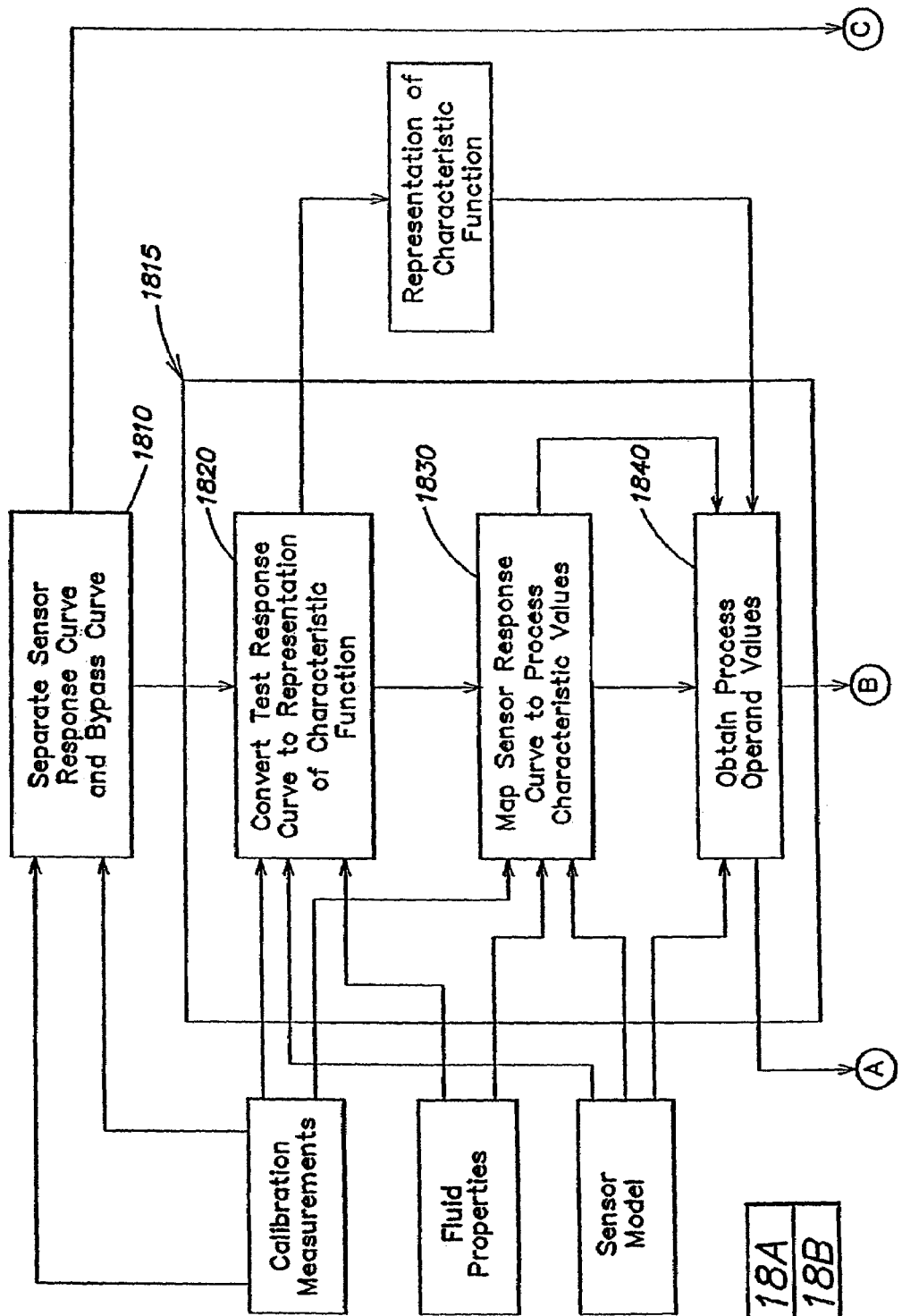
FIGS. 18A and 18B illustrate a method of determining a linearization curve by separately correcting for sensor flow non-linearity and bypass non-linearity based on calibration measurements of a test fluid and a sensor model according to another aspect of the present invention.
Figure 18B:
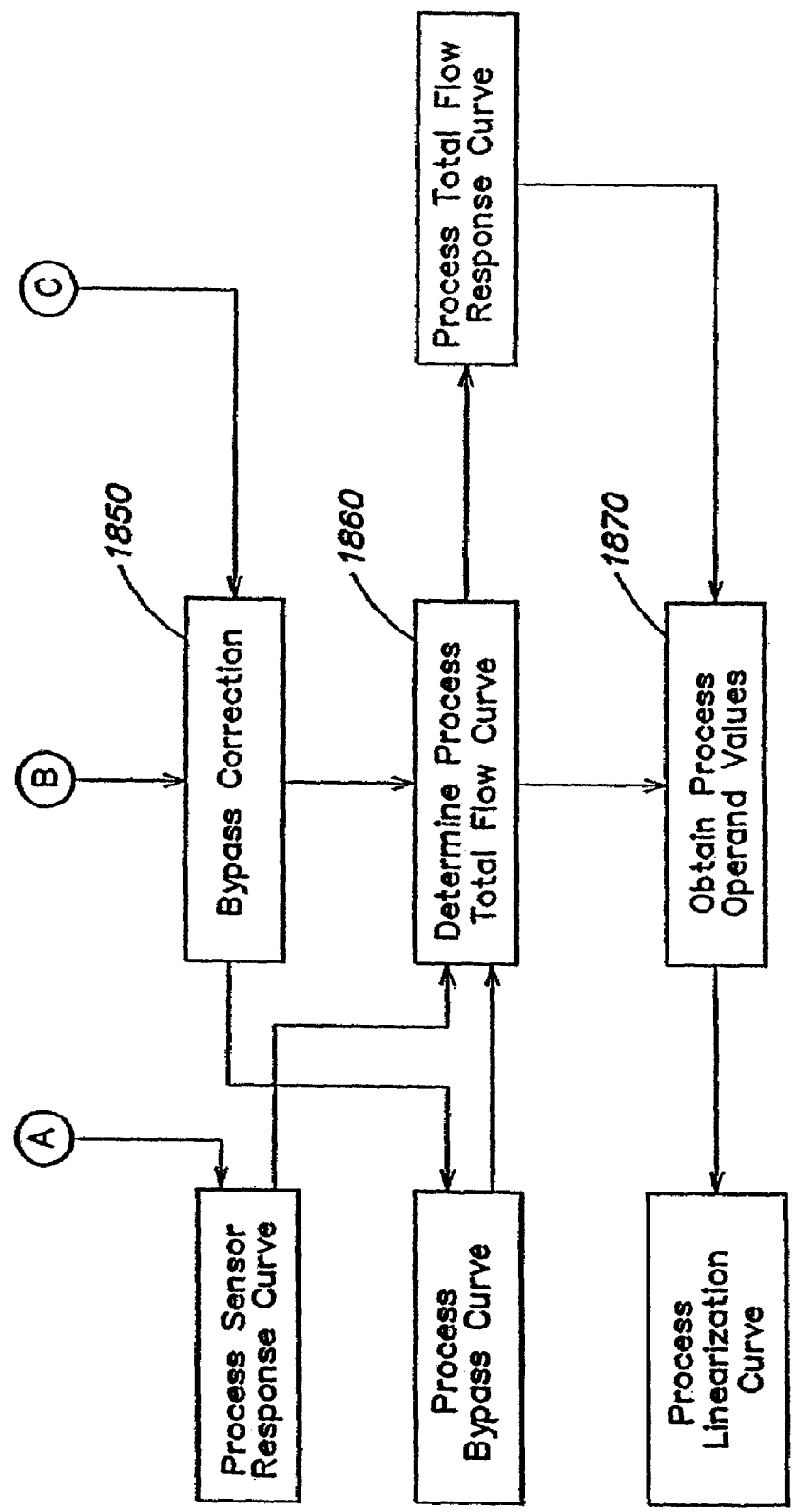

FIG. 18 illustrates one method according to the present invention that may be performed by a processor (e.g., processor 1685) executing one or more programs stored in memory (e.g., memory 1686) to separate and independently correct sensor and bypass effects of a sensor operating on an arbitrary fluid.

When it is desired to operate a sensor (e.g., sensor 1610 incorporated in MFC 1600) on a process fluid different than the test fluid, a linearization curve generated during calibration may need to be corrected to compensate for the behavior differences the sensor may exhibit when operating on different fluids. In step 1810, the total flow response curve of the test fluid obtained during calibration of the sensor may be divided by the sensor response curve of the test fluid also obtained during calibration of the sensor.

It should be appreciated that since the sensor response curve indicates the relationship between sensor flow and sensor output, and the total flow curve indicates the relationship between the total flow and sensor output with the test fluid, the result is an indication of the relationship between sensor flow and total flow, that is, it represents a bypass flow curve. As a result, sensor effects and bypass effects on the test fluid have been separated, that is, two curves have been separated from the total flow response curve: 1) a test sensor response curve; and 2) a test bypass flow curve. The test sensor response curve may be corrected in sensor correction 1815 and the bypass flow curve may be corrected in bypass correction 1850.

In sensor correction 1815, the test sensor response curve may be converted into a process sensor response curve according to various methods described in the foregoing. In particular, in step 1820, each of the sensor output values of the test sensor response curve may be mapped to characteristic values using at least one property of the test fluid. For example, the sensor output values may be multiplied by a scale factor of the test fluid and divided by the thermal conductivity of the test fluid. Each of the flow rate values of the test sensor response curve may be mapped to operand values using at least one property of the sensor and at least one property of the test fluid. For example, the operand values may be computed using a product of the Reynold's number associated with flow through the sensor and the Prandtl number of the test fluid. Accordingly, a representation of the characteristic function of the sensor may be obtained.

In step 1830, each of the sensor output values of the test sensor response curve is mapped to characteristic values using the same mapping as that used in step 1820 except that properties of the process fluid are used instead of the test fluid. For example, each of the sensor output values may be multiplied by a scale factor of the process fluid and divided by the thermal conductivity of the process fluid. Since the sensor model establishes that the characteristic values mapped using process fluid properties will lie along the same curve as characteristic values mapped using test fluid properties, this information can be used to obtain an operand value associated with flow of the process fluid.

In step 1840, the characteristic values computed according to the process fluid are used to index the representation of the characteristic function obtained in step 1820 to obtain an associated operand value. A flow rate associated with each of the obtained operand values may be calculated by reversing the operation of step 1820 using properties of the sensor and the process fluid. Accordingly, a sensor response curve for the process fluid may be obtained by employing the representation of the characteristic function of the sensor. It should be appreciated that the process sensor response curve indicates the relationship between sensor flow and sensor output for the process fluid, that is, the sensor response has been corrected independently of the bypass response.

In bypass correction 1850, the test bypass curve as separated from the test total response flow curve in step 1810 may be corrected to compensate for the behavior of the bypass when operating on the process fluid. In one embodiment, the bypass curve is assumed to remain substantially constant from fluid to fluid such that the test bypass curve is considered equal to the process bypass curve. In other embodiments, a bypass curve may be assumed to depend on a variety of factors including physical properties of the bypass and sensor, for example, the difference in length between the sensor conduit and the bypass, one or more physical properties of the process fluid such as viscosity, temperature of the process fluid, etc. Accordingly, a test bypass curve may be corrected and/or converted to a process bypass curve according to any of various models that describe how the bypass behavior changes when operating on different fluids.

In step 1860, the process sensor response curve is multiplied by the process bypass curve to obtain a process total flow response curve of the sensor with the process fluid. Accordingly, in step 1870, a process linearization curve may be computed that maps values of the process total flow response curve to a substantially straight line. In this manner, a linearization curve for the flow sensor operating on an arbitrary process fluid may be obtained from calibration measurements obtained during calibration of the sensor with a single test fluid.

Having described several embodiments of the invention in detail, various modifications and improvements will readily occur to those skilled in the art. Such modifications and improvements are intended to be within the scope of the invention. While some examples presented herein involve specific combinations of functions or structural elements, it should be understood that those functions and elements may be combined in other ways according to the present invention to accomplish the same or different objectives. In particular, acts, elements and features discussed in connection with one embodiment are not intended to be excluded from a similar role in other embodiments. Accordingly, the foregoing description is by way of example only, and is not intended as limiting. The invention is limited only as defined by the following claims and the equivalents thereto.

What is claimed is:

1. A method of determining flow rates of a process fluid through a sensor conduit with a flow sensor, the method including the use of at least one representation of a characteristic function of the flow sensor obtained during calibration with a test fluid, the method comprising acts of:
   providing a sensor output related to a flow rate of the process fluid through the sensor conduit;
   mapping a sensor output value to a characteristic value based on at least one first property of the process fluid;
   obtaining an operand value including a flow rate component, at least one sensor property component and at least one fluid property component by indexing the at least one representation of the characteristic function with the characteristic value; and
   determining the flow rate component of the operand value using the at least one sensor property component and the at least one fluid property component to provide an indication of the flow rate of the process fluid through the sensor conduit.

2. The method of claim 1, wherein the act of obtaining an operand value includes an act of obtaining an operand value such that the at least one fluid property component is based at least in part on a Prandtl number of the test fluid.

3. The method of claim 1, wherein the act of obtaining an operand value includes an act of obtaining an operand value based at least in part on a product of a Reynolds number associated with flow through the flow sensor and a Prandtl number of the test fluid.

4. The method of claim 1, wherein the act of obtaining an operand value includes an act of obtaining an operand value such that the at least one sensor property component is based at least in part on a Reynolds number associated with flow through the flow sensor, and wherein the act of obtaining an operand value further includes an act of obtaining an operand value including a test fluid scale factor.

5. The method of claim 1, wherein the act of determining the flow rate component includes an act of separating the flow rate component from the operand value using at least one of a Reynolds number associated with flow through the flow sensor flew and a Prandtl number of the process fluid.

6. The method of claim 1, wherein a flow path includes the sensor conduit and a bypass wherein determining a total flow rate of the test fluid includes the use of calibration measurements including a test sensor response curve for the test fluid and a test total response curve for the test fluid.

7. The method of claim 6, further comprising an act of dividing the test total response curve by the test sensor response curve to provide a test bypass flow curve.

8. The method of claim 7, further comprising:
   multiplying the test bypass flow curve by the process sensor response curve to provide a process total flow response curve; and
   providing a linearization curve configured to map values of the process total flow response curve substantially to a straight line.

9. The method of claim 1, wherein determining the flow rate includes the use of calibration measurements including a test sensor response curve and further comprises mapping the test sensor response curve to a process sensor response curve, wherein the act of mapping uses a representation of the characteristic function.

10. The method of claim 9, wherein the act of mapping the test sensor response curve includes mapping each of the sensor output values of the test sensor response curve to a corresponding characteristic value based on at least one first property of the test fluid.

11. The method of claim 9, wherein the act of mapping the test sensor response curve includes mapping each of the test flow rates of the test sensor response curve to an operand value based on the at least one sensor property component and the at least one fluid property component.

12. The method of claim 9, wherein the act of mapping the test sensor response curve includes mapping each of a plurality of sensor output values to a corresponding process characteristic value based on the at least one first property of the process fluid.

13. The method of claim 12, wherein the act of mapping the test sensor response curve comprises:
   determining for each process characteristic value an associated process operand value based on the representation of the characteristic function; and
   determining a process flow rate from each associated process operand values based on the at least one sensor property component and the at least one fluid property component.

14. The method of claim 13, wherein each process flow rate and each of the plurality of sensor output values form the process sensor response curve.

15. The method of claim 9, wherein the act of mapping the test sensor response curve comprises:
   determining a process operand value from each process flow rate based on the at least one sensor property component and the at least one fluid property component; and
   determining for each process operand value an associated process characteristic value based on the representation of the characteristic function.

16. The method of claim 15, wherein the act of mapping the test sensor response curve includes mapping each process characteristic value to a corresponding sensor output value based on the at least one first property of the process fluid.

17. A method of determining flow rates of a process fluid, the method including the use of data derived from a calibration of a flow sensor with a test fluid, the method comprising acts of:
   providing a sensor output related to a flow rate of the process fluid through a conduit of the flow sensor;
   mapping a sensor output value to a characteristic value based on at least one first property of the process fluid;
   obtaining an operand value in response to the characteristic value, the operand value being the value of an operand based on the flow rate, at least one property of the flow sensor, and at least one second property of the process fluid, the operand value being obtained by indexing at least one representation of a function with the characteristic value, wherein the representation of the function is derived from the calibration of the flow sensor with the test fluid such that properties of the test fluid are removed from the function; and
   determining the flow rate through the conduit of the flow sensor using the at least one property of the flow sensor and the at least one second property of the process fluid.

18. The method of claim 17, wherein the act of obtaining an operand value includes an act of obtaining an operand value such that a fluid property component is based at least in part on a Prandtl number of the test fluid.

19. The method of claim 17, wherein the act of obtaining an operand value includes an act of obtaining an operand value based at least in part on a product of a Reynolds number associated with flow through the flow sensor and a Prandtl number of the test fluid.

20. The method of claim 17, wherein the act of obtaining an operand value includes an act of obtaining an operand value such that the at least one property of the flow sensor is based at least in part on a Reynolds number associated with flow through the flow sensor, and wherein the act of obtaining an operand value further includes an act of obtaining an operand value including a test fluid scale factor.

21. The method of claim 17, wherein the act of determining the flow rate includes an act of separating the flow rate from the operand value using at least one of a Reynolds number associated with flow through the flow sensor and a Prandtl number of the process fluid.

22. The method of claim 17, wherein a flow path includes the conduit and a bypass and, wherein determining a total flow rate of the test fluid includes the use of a relationship between the conduit and the bypass.

23. The method of claim 17, wherein determining the flow rate includes the use of a test sensor response curve and further comprises mapping the test sensor response curve to a process sensor response curve using the properties of the test fluid and properties of the process fluid.

24. The method of claim 23, wherein mapping the test sensor response curve includes mapping each of the flow rates of the test sensor response curve to an operand value based on the at least one property of the flow sensor and the at least one second property of the process fluid.

25. The method of claim 23, wherein the act of mapping the test sensor response curve includes mapping each of a plurality of sensor output values to a corresponding process characteristic value based on the at least one first property of the process fluid.

26. The method of claim 23, wherein the act of mapping the test sensor response curve comprises:

determining for each of a plurality of process characteristic values an associated process operand value based on the representation of a characteristic function; and determining a process flow rate from each of the associated process operand values based on the at least one property of the flow sensor and the at least one second property of the process fluid.

27. The method of claim 23, wherein the act of mapping the test sensor response curve comprises:

determining a process operand value from each of a plurality of process flow rates based on the at least one property of the flow sensor and the at least one second property of the process fluid; and determining for each process operand value an associated process characteristic value based on the representation of a characteristic function.

28. The method of claim 17, wherein determining the flow rate includes the use of a representation of a characteristic function associated with the flow sensor that is derived from the calibration of the flow sensor with the test fluid.

29. The method of claim 17, wherein determining the flow rate includes the use of a characteristic sensor response curve and further comprises mapping the characteristic sensor response curve to a process sensor response curve using properties of the process fluid.

30. The method of claim 17, wherein a mass flow meter performs the mapping of the sensor output value, the obtaining of the operand value, and the determining of the flow rate.

31. The method of claim 17, and further comprising:

comparing the determined flow rate to a desired flow rate using a mass flow controller;

generating a control signal in response to the comparison; and adjusting the flow rate of the process fluid in response to the generated control signal.

* * * * *